United States Patent
Li et al.

(10) Patent No.: US 10,505,692 B2
(45) Date of Patent: Dec. 10, 2019

(54) CONTROL INFORMATION MCS OFFSET DETERMINATION FOR UCI ON PUSCH WITH SHORTENED TTI

(71) Applicant: Telefonaktiebolaget LM Ericsson (publ), Stockholm (SE)

(72) Inventors: Jingya Li, Göteborg (SE); Laetitia Falconetti, Järfälla (SE); Daniel Larsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/736,186

(22) PCT Filed: Sep. 28, 2017

(86) PCT No.: PCT/SE2017/050943
§ 371 (c)(1),
(2) Date: Dec. 13, 2017

(87) PCT Pub. No.: WO2018/063067
PCT Pub. Date: Apr. 5, 2018

(65) Prior Publication Data
US 2019/0007182 A1    Jan. 3, 2019

Related U.S. Application Data

(60) Provisional application No. 62/402,288, filed on Sep. 30, 2016.

(51) Int. Cl.
*H04L 5/00*    (2006.01)
*H04L 1/18*    (2006.01)
(Continued)

(52) U.S. Cl.
CPC .......... *H04L 5/0055* (2013.01); *H04L 1/007* (2013.01); *H04L 1/0025* (2013.01);
(Continued)

(58) Field of Classification Search
CPC ... H04L 1/1854; H04L 5/0044; H04L 5/0055; H04L 1/0025; H04L 1/007; H04L 1/0072;
(Continued)

(56) References Cited

U.S. PATENT DOCUMENTS

2016/0234830 A1*  8/2016  Kim ................ H04L 1/1861
2018/0255550 A1*  9/2018  Takeda ............. H04L 5/0094
(Continued)

FOREIGN PATENT DOCUMENTS

CA        2 967 281      6/2016
WO     WO 2016/040290    3/2016
(Continued)

OTHER PUBLICATIONS

PCT Internation Search Report; International application No. PCT/SE2017/050943, dated Jan. 2, 2018; 5 pages; and Written Opinion of the International Searching Authority, International application No. PCT/SE2017/050943 dated Jan. 2, 2018, 14 pages.
(Continued)

*Primary Examiner* — Brian D Nguyen
(74) *Attorney, Agent, or Firm* — Baker Botts, LLP

(57) ABSTRACT

According to certain embodiments, a method is disclosed for use in a wireless device that is transmitting uplink transmissions using a shortened transmission time interval (sTTI). The method comprises receiving control information from a network node. The control information indicates at least one index, and a beta-offset value is obtained based on the indicated index.

28 Claims, 12 Drawing Sheets

(51) Int. Cl.
*H04W 72/04* (2009.01)
*H04W 72/08* (2009.01)
*H04L 1/00* (2006.01)

(52) U.S. Cl.
CPC .......... *H04L 1/0072* (2013.01); *H04L 1/1854* (2013.01); *H04L 5/0044* (2013.01); *H04W 72/0413* (2013.01); *H04W 72/0446* (2013.01); *H04W 72/085* (2013.01); *Y02D 30/30* (2018.01)

(58) Field of Classification Search
CPC .......... H04W 72/0413; H04W 72/085; H04W 72/0446; Y02D 30/30
See application file for complete search history.

(56) References Cited

U.S. PATENT DOCUMENTS

2019/0028313 A1* 1/2019 Takeda .................. H04W 72/04
2019/0037554 A1* 1/2019 Gao ...................... H04L 5/0051

FOREIGN PATENT DOCUMENTS

| WO | 2016 142006 A1 | 9/2016 |
| WO | 2017 008840 A1 | 1/2017 |
| WO | 2017 196250 A1 | 11/2017 |

OTHER PUBLICATIONS

Ericsson: "UCI on sPUSCH with short TTI", 3GPP Draft: R1-1706079, 3rd Generation Partnership Project (3GPP), Mobile Competence Centre: 650, Route Des Lucioles: F-06921 Sophia-Antipolis Cedex; France; vol. RAN WG1, no. Spokane, USA; Apr. 3, 2017-Apr. 7, 2014; Mar. 24, 2017; XP051250838, Retrieved from the Internet: URL:http://www.3gpp.org/ftp/tsg_ran/WG1_RL1/TSGR1_88b/Docs/ [retrieved on Mar. 24, 2017] *section 1*.

Samsung: "SDCI design for sTTI operations" 3GPP Draft; R1-16670—SDCI Design, 3rd Generation Partnership Project (3GPP), Mobile Competence Centre; 650, Route Des Lucioles; F-06921 Sophia-Antipolis Cedex France, 4 pages; vol. RAN WG1, no. Gothenburg, Sweden Aug. 22, 2016-Aug. 26, 2016 Aug. 21, 2016 XP051125523, Retrieved from the Internet: URL:http://www.3gpp.org/ftp/Meetings_3GPP_ SYNC/RAN1/Docs/ [retrieved on Aug. 21, 2016]*section 2*.

3GPP TS 36.213 v13.0.0, Control information MCS offset determination—Dec. 2015.

3GPP TS 36.211 v13.0,0, SC-FDMA baseband signal generation—Dec. 2015.

3GPP TS 36.212 v13.0.0, Uplink control information on PUSCH without UL-SCH data—Dec. 2015.

* cited by examiner

FIG. 2

RI = RI
HARQ = HARQ-A/N
C/P = CQI/PMI
D = DM-RS
U = UL-SCH data

CONTROL INFORMATION MCS OFFSET DETERMINATION FOR UCI ON PUSCH WITH SHORTENED TTI

PRIORITY

This nonprovisional application is a U.S. National Stage Filing under 35 U.S.C. § 371 of International Patent Application Serial No. PCT/SE2017/050943 filed Sep. 28, 2017, and entitled "Control Information MCS Offset Determination For UCI On PUSCH With Shortened TTI" which claims priority to U.S. Provisional Patent Application No. 62/402,288 filed Sep. 30, 2016, both of which are hereby incorporated by reference in their entirety.

TECHNICAL FIELD

Certain embodiments of the present disclosure relate, in general, to wireless communications and, more particularly, to control information modulation and coding scheme (MCS) offset determination for uplink control information (UCI) on physical uplink shared channel (PUSCH) with shortened transmission time interval (sTTI).

BACKGROUND

1. Latency Reduction with Short TTI

Packet data latency is one of the performance metrics that vendors, operators and also end-users (via speed test applications) regularly measures. Latency measurements are done in all phases of a radio access network system lifetime, when verifying a new software release or system component, when deploying a system and when the system is in commercial operation.

One performance metric that guided the design of Long Term Evolution (LTE) was shorter latency (as compared to previous generations of 3GPP radio access technologies). LTE is also now recognized by the end-users to be a system that provides faster access to internet and lower data latencies than previous generations of mobile radio technologies.

Packet data latency is important not only for the perceived responsiveness of the system; it is also a parameter that indirectly influences the throughput of the system. HTTP/TCP is the dominating application and transport layer protocol suite used on the internet today. According to HTTP Archive (http://httparchive.org/trends.php) the typical size of HTTP based transactions over the internet are in the range of a few 10s of kilobytes (KB) up to 1 megabyte (MB). In this size range, the TCP slow start period is a significant part of the total transport period of the packet stream. During TCP slow start the performance is latency limited. Hence, improved latency can rather easily be showed to improve the average throughput, for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions, which may free up radio resources and potentially improve the capacity of the system.

One area to address when it comes to packet latency reductions is the reduction of transport Time of data and control signaling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix (wherein OFDM refers to Orthogonal Frequency Division Multiple Access, and SC-FDMA refers to Single Carrier—Frequency Division Multiple Access). In LIE release 13, a study item is starting during 2015, with the goal of specifying transmissions with shorter TTIs that are much shorter than the LTE release 8 TTI.

The shorter TTIs can be decided to have any duration in time shorter than a normal 1 ms TTI and comprise resources on a number of OFDM or SC-FDMA symbols within a 1 ms subframe (SF). As one example, the duration of the short TTI may be 0.5 ms, i.e. seven OFDM or SC-FDMA symbols for the case with normal cyclic prefix. As another example, the duration of the short TTI may be 2 symbols.

2. DFT Spread OFDM in Uplink

The 4G wireless access within LTE is based on OFDM in the downlink and discrete Fourier transform (DFT)-spread OFDM (a.k.a. SC-FDMA) in the uplink [see 3GPP TS 36.211]. An illustration of DFT-spread OFDM is given in FIG. 1, where the information bits are used to calculate an error detection code (CRC, Cyclic Redundancy Check), channel coded, rate matched and modulated to complex valued symbols such as QPSK, 16QAM or 64QAM. Symbols corresponding, to several control entities and symbols corresponding to payload are then multiplexed, pre-coded by a DFT (transform precoding), mapped to a frequency interval in which it is allocated, transformed to the time domain, concatenated with a cyclic prefix and finally transmitted over air. The order of some of the processing blocks might be changed. For example, the modulation might be placed after the multiplexing instead of before. The symbol constructed by the DFT, mapping, IFFT and CP insertion is denoted as a SC-FDMA symbol in [3GPP TS 36.211, section 5.6]. Within LTE release 8, a TTI is constructed by 14 such SC-FDMA symbols.

This DFT-spread OFDM as used in uplink has significantly lower PAPR (Peak to Average Power Ratio) as compared to OFDM. By having a low PAPR, the transmitter can be equipped with simpler and less energy consuming radio equipment which is important for user devices where cost and battery consumptions are important issues. In future 5G systems, this single carrier property with low PAPR might be important not only for uplink but also for downlink and device-to device transmissions.

3. Uplink Control Information

Uplink control information (UCI) is used to support data transmission on downlink and uplink transport channels. The UCI consists of:

- Scheduling request, indicating that the UE requests uplink resources for uplink data transmission.
- HARQ ACK/NACK, used to acknowledge the received data transport blocks on the physical downlink shared channel (PDSCH).
- Channel state information (CSI) reports, consisting of channel quality indicator (CQI), preceding matrix indicator (PMI), and rank index (RI), and CSI-RS resource indication (CRI). The CSI reports are related to downlink channel conditions, and are used to assist downlink channel-dependent scheduling.

In LTE, two different methods are supported for transmitting UCI. In the first method, if the UE does not have a valid scheduling grant, the PUCCH is used for transmitting UCI. In the second method, if the UE has a valid scheduling grant, then the UCI is time multiplexed with the coded UL-SCH on to the PUSCH, prior to DFT spreading and OFDM modulation in order to preserve the low cubic matric single-earner property.

3.1 UCI on PUSCH

If the UE has a valid scheduling grant, the UCI is time multiplexed with the data on PUSCH. Since the UE is already scheduled, there is no need to transmit scheduling request, and the in-band buffer status reports are sent as part of the medium access control (MAC) headers. Therefore, only HARQ ACK/NACK and CSI reports are transmitted on PUSCH.

Figure 2:
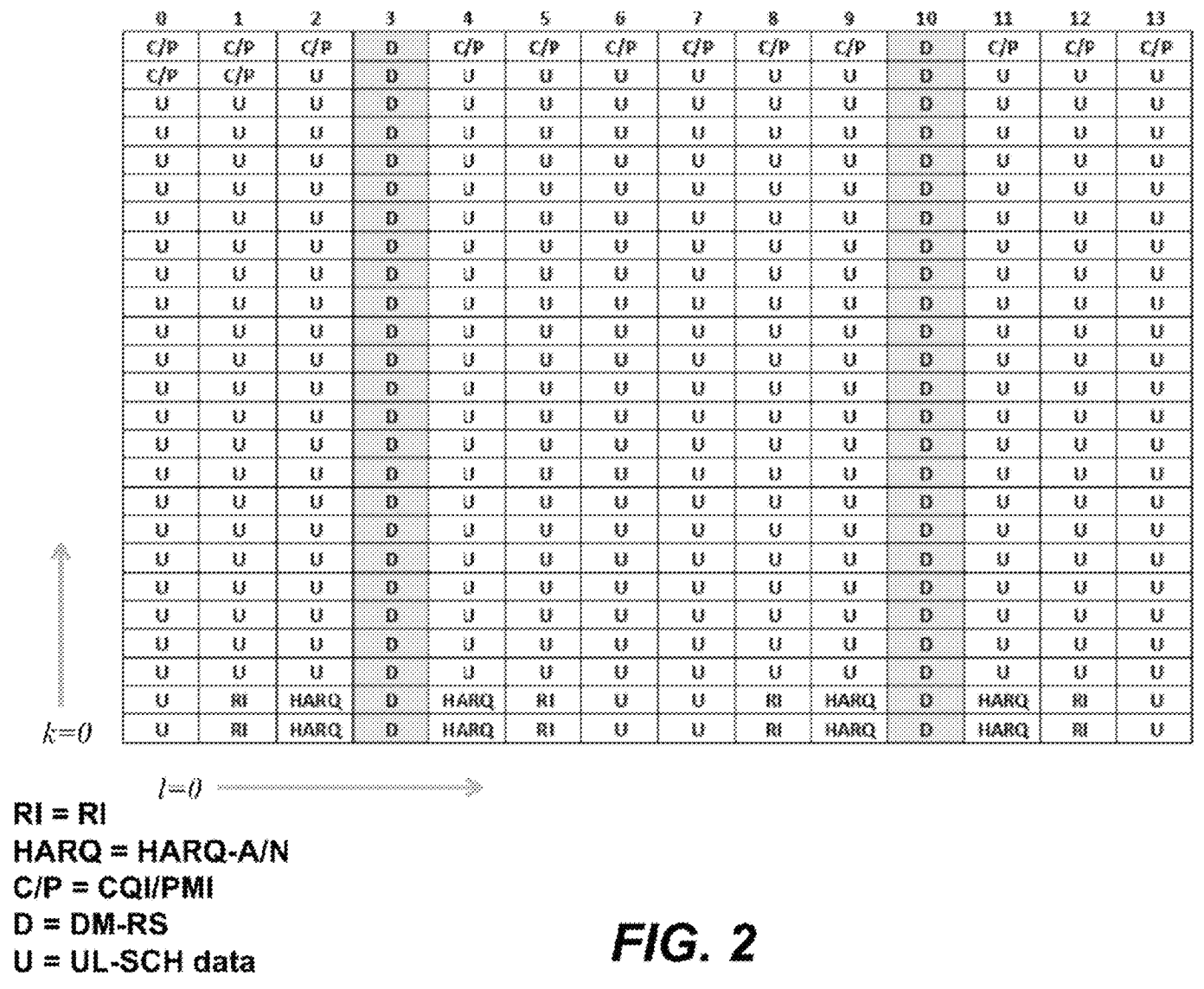

FIG. 2 shows the time multiplexing of UCI and data on PUSCH. In particular, FIG. 2 shows the time multiplexing of CQI/PMI, RI/CRI and HARQ ACK/NACK with the data symbols on to PUSCH, based on 3GPP TS 36.212 v13.0.0 and 3GPP TS 36.2.11 v13.0.0. Here, the column index l=0, 1, . . . , 13 corresponds to SC-FDMA symbol index. The row index k=0, 1, . . . , M is symbol index before transform precoding (see section 5.3.3 in 3GPP TS 36.211), where M is the number of subcarriers allocated to the PUSCH. Each box corresponds to a coded modulation symbol. Each column of the coded modulation symbols, in blocks of M symbols, are fed though a size-M DFT. Note that no DFT is applied to DMRS symbols (symbols 3 and 10 in FIG. 2). The structure of the DMRS itself ensures a low cubic matrix. In FIG. 2, RI refers to RI, HARQ refers to HARQ-A/N, C/P refers to CQI/PMI, D refers to DM-RS, and U refers to UL-SCH data.

The HARQ ACK/NACK is important for proper operation of the downlink. Thus, the HARQ ACK/NACK symbols are placed to the SC-FDMA symbols 2, 4, 9 and 11, which are close to DMRS in order to achieve good channel estimation. There is a certain probability that the UE misses some downlink assignment on the PDCCH. In such cases, the actual HARQ feedback payload from the UE is different from the one expected by the eNodeB. To avoid the effect of such errors, the coded HARQ ACK/NACK symbols are punctured into the coded data on PUSCH.

The coded RI symbols are placed close to HARQ ACK/NACK symbol positions, so that they are also close to DMRS to be able to achieve good channel estimation. This is motivated by the fact that the decoding of CQI/PMI relies on the correct decoding of RI. The CQI/PMI is mapped across the full subframe duration. The special mapping of CQI/PMI is less pronounced, since CSI reports are mainly useful for low-to-medium Doppler frequencies. The UL-SCH rate matching takes the presence of the CQI/PMI and RI into account. Note that RI can contain both, rank indication and CSI-RS resource indication (CRI).

3.2 Determine the Size of Control Region on PUSCH

If UCI is multiplexed with UL-SCH data on PUSCH, then, the amount of resources, i.e. the number of coded modulation symbols, for each type of control information can be obtained based on the corresponding formulations given in section 5.2.2.6 in TS 36.212 v13.0.0. When UCI is send via PUSCH without UL-SCH data, the amount of resources for each type of UCI is derived according to Section 5.2.4 in TS 36.212 v13.0.0 instead.

3.2.1 UCI on PUSCH with UL-SCH Data

3.2.1.1. HARQ ACK/NACK and RI/CRI

To determine the number of coded modulation symbols per layer Q' for HARQ ACK/NACK and RI/CRI:

For the case when only one transport block is transmitted in the PUSCH conveying the HARQ-ACK bits, RI or CRI bits:

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH-initial}\right) \quad (1)$$

$$\approx \min\left(\left\lceil \frac{O}{Q_m \cdot R} \cdot \beta_{offset}^{PUSCH} \right\rceil, 4 \cdot M_{sc}^{PUSCH-initial}\right),$$

In the above example:
- O is the number of HARQ-ACK bits, rank indicator bits or CRI bits, and
- $Q_m$ and R are the modulation order and coding rate of the transport block.
- $M_{SC}^{PUSCH-initial}$ is the scheduled bandwidth for initial PUSCH transmission for the transport block, expressed as a number of subcarriers
- $n_{symb}^{PUSCH-initial}$ is the number of SC-FDMA symbols per short TTI for initial PUSCH transmission for the same transport block, excluding the DMRS symbols and SRS symbols if SRS is transmitted in the initial PUSCH.
- C is the number of code blocks for initial PUSCH transmission for the same TB
- $K_\tau$ is the number of bits in the code block number $\tau$
- $\beta_{offset}^{PUSCH}$ is the MSC offset between the data and the control information, with $\beta_{offset}^{PUSCH} = \beta_{offset}^{HARQ-ACK}$ for HARQ-ACK, and $\beta_{offset}^{PUSCH} = \beta_{offset}^{RI}$ for RI.
- $4 \cdot M_{SC}^{PUSCH-initial}$ is the maximum number of coded modulation symbols (i.e., the maximum amount of resources) for the corresponding control information.

For the case when two transport blocks are transmitted in the PUSCH conveying the HARQ-ACK bits, rank indicator bits or CRI bits:

$$Q' = \max[\min(Q'_{temp}, 4 \cdot M_{sc}^{PUSCH-initial}), Q'_{min}] \text{ with} \quad (2)$$

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil$$

$$\approx \left\lceil \frac{O}{Q_m^{(1)} \cdot R^{(1)}} \cdot \beta_{offset}^{PUSCH} + \frac{O}{Q_m^{(2)} \cdot R^{(2)}} \cdot \beta_{offset}^{PUSCH} \right\rceil$$

In the above example:
- O is the number of HARQ-ACK bits, rank indicator bits or CRI bits,
- $Q_m^{(x)}$ and $R^{(x)}$, $x=\{1,2\}$, are the modulation order and coding rate of the first and second transport block, respectively.
- $M_{SC}^{PUSCH\text{-}initial(x)}$, $x=\{1,2\}$ are the scheduled bandwidths for PUSCH transmission in the initial short TTI for the first and second transport block, respectively, expressed as a number of subcarriers
- $N_{symb}^{PUSCH\text{-}initial(x)}$, $x=\{1,2\}$ are the number of SC-FDMA symbols per short TTI for initial PUSCH transmission for the first and second transport block, respectively, excluding the DMRS symbols and SRS symbols if SRS is transmitted in the initial short physical uplink shared channel (sPUSCH).
- $C^{(x)}$, $x=\{1,2\}$ are the number of code blocks for initial PUSCH transmission for the first and second transport block, respectively.
- $K_r^{(x)}$, $x=\{1,2\}$ are the number of bits in the code block number r for the first and second transport block, respectively.
- $Q'_{min} = O$ if $O \leq 2$, $Q'_{min} = \lceil 2O/Q'_m \rceil$ if $3 \leq O \leq 11$ with $Q'_m = \min(Q_m^1 \cdot Q_m^2)$ where $Q_m^x$, $x=\{1,2\}$ is the modulation order of transport block "x", and $Q'_{min} = \lceil 2O_1/Q'_m \rceil + \lceil 2O_2/Q'_m \rceil$ if $O > 11$ with $O_1 = \lceil O/2 \rceil$ and $O_2 = O - \lceil O/2 \rceil$.
- $\beta_{offset}^{PUSCH}$ is the MSC offset between the data and the control information, with $\beta_{offset}^{PUSCH} = \beta_{offset}^{HARQ\text{-}ACK}$ for HARQ-ACK, and $\beta_{offset}^{PUSCH} = \beta_{offset}^{RI}$ for RI.

3.2.1.2 CQI/PMI

To determine the number of coded modulation symbols per layer Q' for CQI/PMI:

$$Q' = \min\left(\left\lceil \frac{(O+L) \cdot M_{sc}^{PUSCH\text{-}initial(x)} \cdot N_{symb}^{PUSCH\text{-}initial(x)} \cdot \beta_{offset}^{PUSCH}}{\sum_{r=0}^{C^{(x)}-1} K_r^{(x)}} \right\rceil, M_{sc}^{PUSCH} \cdot N_{symb}^{PUSCH} - \frac{Q_{RI}^{(x)}}{Q_m^{(x)}}\right) \quad (3)$$

$$\approx \min\left(\left\lceil \frac{(O+L)}{Q_m^{(x)} \cdot R^{(x)}} \cdot \beta_{offset}^{PUSCH}\right\rceil, M_{sc}^{PUSCH} \cdot N_{symb}^{PUSCH} - Q'^{(x)}_{RI}\right)$$

In the above example:
- O is the number of CQI/PMI bits, and
- L is the number of CRC bits given by $$L = \begin{cases} 0 & O \leq 11 \\ 8 & \text{otherwise} \end{cases},$$

and
- $M_{SC}^{PUSCH}$ is the scheduled bandwidth for current PUSCH transmission for the transport block, expressed as a number of subcarriers
- $N_{symb}^{PUSCH}$ is the number of SC-FDMA symbols for the current PUSCH transmission, excluding the DMRS symbols and SRS symbols if SRS is transmitted in the current PUSCH.
- $Q_{RI}^{(x)}$ and $Q'^{(x)}_{RI}$ are the number of coded bits of RI and the number of coded modulation symbols of RI, respectively, multiplexed with the transport block with the highest $I_{MCS}$ value,
- $Q_m^{(x)}$ and $R^{(x)}$ are the modulation order and coding rate of the transport block with the highest $I_{MCS}$ value indicated by the initial UL grant.
- $M_{SC}^{PUSCH\text{-}initial(x)}$, $N_{symb}^{PUSCH\text{-}initial(x)}$, $C^{(x)}$ and $K_r^{(x)}$ are parameters related to the same transport block.
- $\beta_{offset}^{PUSCH} = \beta_{offset}^{CQI}$ is the MSC offset between the data and the CQI/PMI.

3.2.2 UCI on PUSCH without UL-SCH Data

In case of full TTI operation (1 ms TTI), an eNB can schedule an aperiodic CQI report which is transmitted as UCI on PUSCH by the UE. The UE may not have any data in buffer and thus PUSCH will only contain UCI. In this case, the amount of resources for each type of UCI is derived as follows (see Section 5.2.4 in TS 36.212 v13.0.0);

3.2.2.1 HARQ ACK/NACK and RI/CRI

To determine the number of coded modulation symbols per layer Q' for HARQ ACK/NACK and RI/CRI:

$$Q' = \min\left(\left\lceil \frac{O \cdot M_{sc}^{PUSCH} \cdot N_{symb}^{PUSCH} \cdot \beta_{offset}^{PUSCH}}{O_{CQI\text{-}MIN}}\right\rceil, 4 \cdot M_{sc}^{PUSCH\text{-}initial}\right) \quad (4)$$

In the above example:
- $O_{CQI\text{-}MIN}$ is the number of CQI bits including CRC bits assuming rank equals to 1 for all serving cells for which an aperiodic CSI report is triggered.
- $\beta_{offset}^{PUSCH}$ is the MCS offset between HARQ-ACK and CQI/PMI or the MSC offset between RI/CRI and CQI/PMI. For HARQ-ACK information, $\beta_{offset}^{PUSCH} = \beta_{offset}^{HARQ\text{-}ACK}/\beta_{offset}^{CQI}$; for RI information, $\beta_{offset}^{PUSCH} = \beta_{offset}^{RI}/\beta_{offset}^{CQI}$.

The other parameters are defined above in Section 3.2.1. "UCI on PUSCH with UL-SCH Data."

3.2.2.2 CQI/PMI

To determine the number of coded modulation symbols per layer Q' for CQI/PMI:

$$Q'_{CQI} = Q_{CQI}/Q_m \quad (5)$$
$$= N_{symb}^{PUSCH} \cdot M_{sc}^{PUSCH} - Q_{RI}/Q_m$$
$$= N_{symb}^{PUSCH} \cdot M_{sc}^{PUSCH} - Q'_{RI}$$

The parameters are defined above in Section 3.2.1, "UCI on PUSCH with UL-SCH data."

3.3 Determine UCI MCS Offset, $\beta_{offset}^{PUSCH}$

The UCI MCS offset, $\beta_{offset}^{PUSCH} \geq 1$, is used for controlling the additional coding gain (i.e., lower coding rate)

for the UCI over data. This MCS offset parameter is user-specific, and is semi-statically configured by a high-layer signaling index for each type of UCI.

For each type of UCI, HARQ-ACK, RI and CQI/PMI, a table is pre-defined for mapping the index signaled by high layers to the MCS offset value (see Section 8.6.3 in TS 36.213). Different signaling indexes will be used for single and multi-codeword PUSCH transmissions.

The offset values for HARQ-ACK also depends on the payload size, where a different signaling index will be used if the UE transmits more than 22 HARQ-ACK bits.

SUMMARY

Certain problems can be envisioned for existing high layer signaling indexes for determining the UCI MCS offset value. For example, existing high layer signaling indexes for determining the UCI MCS offset value cannot support transmitting UCI on PUSCH with shortened TTI. Moreover, the UCI MCS offset values need to be designed in order to control the coding rate of UCI on PUSCH with shortened TTI, and to determine the number of resources allocated for each type of UCI that are transmitted on PUSCH with shortened TTI.

Particular embodiments of the present disclosure may provide a solution to this and other problems. The present disclosure proposes ways of determining the values of beta-offsets, such as the MCS offset for UCI, when the UCI is sent via PUSCH with a shortened TTI. In addition, the present disclosure proposes ways of signaling the MCS offset values for the case where UCI is transmitted on PUSCH with shortened TTIs.

A first type of embodiments disclose methods for use in a wireless device. As an example, according to certain embodiments, a method is disclosed for use in a wireless device that is transmitting uplink transmissions using a shortened transmission time interval (sTTI). The method comprises receiving control information from a network node. The control information indicates at least one index for obtaining a beta-offset value.

As another example, according to certain embodiments, a method is disclosed for use in a wireless device that is transmitting uplink control information (UCI) on sPUSCH, a physical uplink shared channel (PUSCH) using a shortened transmission time interval (sTTI). The method is for obtaining a beta-offset value. The method comprises receiving an index from a network node. The index is configured independently for sTTI transmission compared to normal TTI transmission. The method further comprises mapping the received index to a table and thereby obtaining the beta-offset value.

A second type of embodiments disclose a wireless device. For example, according to certain embodiments, a wireless device comprises memory operable to store instructions and processing circuitry operable to execute the instructions. The wireless device is operable to receive control information from a network node. The control information indicates at least one index. The wireless device is operable to obtain a beta-offset based on the indicated index. The beta-offset value is for an uplink transmission having a shortened transmission time interval (sTTI).

A third type of embodiments disclose computer program products that may be used in a wireless device. For example, according to certain embodiments, a computer program product comprises a non-transitory computer readable medium. The non-transitory computer readable medium stores computer readable program code. The computer readable program code comprises program code for receiving control information from a network node. The control information indicates at least one index. The computer readable program code comprises program code for obtaining a beta-offset based on the indicated index. The beta-offset value is for an uplink transmission having a shortened transmission time interval (sTTI).

A fourth type of embodiments disclose methods for use in a network node. For example, according to certain embodiments, a method is disclosed for use in a network node. The method is for indicating a beta-offset value to a wireless device. The wireless device is transmitting uplink transmissions using a shortened transmission time interval (sTTI). The method comprises communicating control information to one or more wireless devices. The control information indicates at least one index. The beta-offset value is obtained based on the indicated index.

A fifth type of embodiments disclose a network node. For example, according to certain embodiments, a network node comprises memory operable to store instructions and processing circuitry operable to execute the instructions. The network node is operable to communicate control information to one or more wireless devices. The control information indicates at least one index. A beta-offset value for an uplink transmission having a shortened transmission time Interval (sTTI) is obtained based on the indicated index.

A sixth type of embodiments disclose a computer program product that may be used in a network node. For example, according to certain embodiments, a computer program product comprises a non-transitory computer readable medium. The non-transitory computer readable medium stores computer readable program code. The computer readable program code comprises program code for communicating control information to one or more wireless devices. The control information indicates at least one index. A beta-offset value for an uplink transmission having a shortened transmission time interval (sTTI) is obtained based on the indicated index.

Certain embodiments related to a wireless device (e.g., first through third types of embodiments discussed above) may obtain the beta-offset value by mapping the received at least one index to a corresponding beta-value using a table. Certain embodiments may transmit uplink control information (UCI) on sPUSCH, a physical uplink shared channel (PUSCH) using a sTTI, using the obtained beta-offset value.

Certain embodiments related to a wireless device (e.g., first through third types of embodiments discussed above) and/or certain embodiments related to a network node (e.g., fourth through sixth types of embodiments discussed above) may include one or more of the following additional features:

In certain embodiments, the at least one index is selected from a plurality of indexes each mapping to a corresponding beta-offset value using a table.

In certain embodiments, the beta-offset value is a modulation and coding scheme (MCS) offset for uplink control information (UCI) being sent on sPUSCH (an sPUSCH refers to a physical uplink shared channel using a shortened transmission time interval).

In certain embodiments that use a table to map the received index to a corresponding beta-value, the table comprises at least one index corresponding to a beta-offset value for transmitting UCI on the sPUSCH with the sTTI. Such index is different than any index corresponding to a beta-offset value for transmitting UCI on the PUSCH with the normal TTI of 1 ms.

In certain embodiments, the table used is common for sTTI and normal TTI of 1 millisecond (ms), and at least one index in the table is specifically for communication using sTTI.

In certain embodiments, the table is configured to be the same as an existing table for transmitting the uplink control information (UCI) on a physical uplink shared channel (PUSCH) with a normal TTI of 1 millisecond (ms). For example, in certain embodiments, the existing table is configured according to LTE Release 14 or earlier release.

In certain embodiments, the table is selected from a plurality of tables and the control information indicates the selected table. For example, in certain embodiments, the plurality of tables comprise a first table associated with a first type of UCI and a second table associated with a second type of UCI. The beta-offset value in the first table can be independent of the length of the sTTI for the first type of UCI, or the beta-offset value in the first table can depend on the length of the sTTI for the first type of UCI.

In certain embodiments, the index(es) indicated in the control information are based on a payload size of a hybrid automatic repeat request-acknowledgement (HARQ-ACK) transmission.

In certain embodiments, the index is sent/received via radio resource control (RRC) signaling.

In certain embodiments, the table comprises one or more indexes defined for normal TTI of 1 millisecond (ms) according to an existing table. The table also comprises one or more indexes defined for sTTI that have been added to the existing table. The indicated index corresponds to one of the indexes defined for sTTI.

In certain embodiments, the control information indicates whether to apply scaling to the beta-offset value that maps to the indicated index. Optionally, the scaling can be according to a scaling factor that is pre-defined based on the length of the sTTI. In certain embodiments, the control information communicated by the network node comprises the scaling factor to apply to the beta-offset value that maps to the indicated index.

In certain embodiments, the control information from the network node indicates more than one index, and the wireless device may select which beta-offset to apply from among the beta-offset values corresponding to the indicated indexes.

In certain embodiments, the table mapping the index to the beta-offset value reuses fewer than all of the existing indexes of an existing table.

In certain embodiments, the sTTI is less than a transmission time interval specified in long term evolution (LTE) release 8.

In certain embodiments, the index(es) indicated in the control information are based on a payload size of a hybrid automatic repeat request-acknowledgement (HARQ-ACK) transmission.

With respect to certain embodiments related to the network node, the index(es) to indicate in the control information can be determined either depending on or independently of the length of the sTTI.

In some embodiments, for transmitting UCI on sPUSCH, beta factors are independently configured compared to 1 ms operation (TTI of 1 ms), but are based on the 1 ms beta-offset tables. One or more of the pre-defined tables ("legacy tables") used for normal length (non shortened) TTI may be reused, or part of that table, such as reusing 5 out of 10 rows in the table. Further, new tables may be defined by choosing a subset of the beta/MCS offset indices/values from a complete set of indices/values listed in the legacy tables.

Certain embodiments of the present disclosure may provide one or more technical advantages. For example, certain embodiments enable transmission of uplink control information on PUSCH with shortened TTI. In particular, the designed MCS offset values can be used for controlling the coding rate of UCI on sPUSCH. Moreover, the proposed signaling methods enables the eNodeB to configure the UCI transmission on sPUSCH by taking into account the trade-off between UCI transmission reliability (i.e. lower coding rate for UCI, less resources left for UL-SCH data) and improving the system throughput (i.e. higher coding rate for UCI, more resources left for UL-SCH data). Certain embodiments may have all, some, or none of these advantages. Other advantages will be apparent to persons of ordinary skill in the art.

Certain embodiments of the present disclosure may potentially be combined with one or more related concepts contemplated below:

PUSCH with Shortened TTI

As mentioned before, one way to reduce latency is to reduce the TTI length. In uplink transmissions, one or more SC-FDMA symbols with demodulation reference signal (DMRS) transmitted for each short TTI leads to an increased overhead and a corresponding decrease in data rates, when the length of the TTI is reduced.

The present disclosure proposes certain techniques that may address this or other problems. Examples of such techniques set forth below:

Transmitting a reference signal in a communications network: to reduce overhead, the reference signals from several transmitters are multiplexed into the same SC-FDMA symbol while the user data from different transmitters are transmitted in separate SC-FDMA symbols.

Flexible DMRS far subframes: short PDSCH do not necessarily contain DMRS if recent DMRS transmissions to the same UE have occurred. The presence of DMRS in a downlink short TTI is either signaled in the short PDCCH or the UE tries to blindly decode the transmission under the two assumptions that DMRS is present or not. This dynamic DMRS insertion can also be applied to PUSCH for uplink transmissions within short TTIs.

Signaling of uplink transmissions with fixed short TTI patterns, different uplink short TTI patterns for PUSCH are proposed considering different short TTI lengths. In particular, the positions of reference symbols and data symbols, and the length of each short TTI for a PUSCH are fixed for each SF.

Throughout this disclosure, the term "short PUSCH" (sPUSCH) is used to denote the uplink physical shared channel with short TTIs.

UCI on sPUSCH

The existing way of multiplexing UCI and data on PUSCH is designed for a fixed length of 1 ms PUSCH transmission. For TTI length of 7 symbols, the multiplexing method in one slot can be reused. However, if TTI length is less than 7 symbols, some SC-FDMA symbols that are used for UCI may become unavailable. In addition, the DMRS positions for sPUSCH may be changed, so that the existing UCI mapping rule cannot be applicable.

Uplink control signaling on PUSCH with shortened TTI: different UCI mapping solutions are provided by taking into account different short TTI lengths and different DMRS configurations for a sPUSCH. In addition, new formulations are proposed for deriving the amount of resources used for each type of UCI on PUSCH. The formulations are given as a function of $\beta_{offset}^{sPUSCH}$, which denotes the MCS offset parameter for UCI transmitted on sPUSCH.

BRIEF DESCRIPTION

FIG. 2 is a diagram illustrating the time multiplexing of UCI and data on PUSCH.

DETAILED DESCRIPTION

Figure 1:
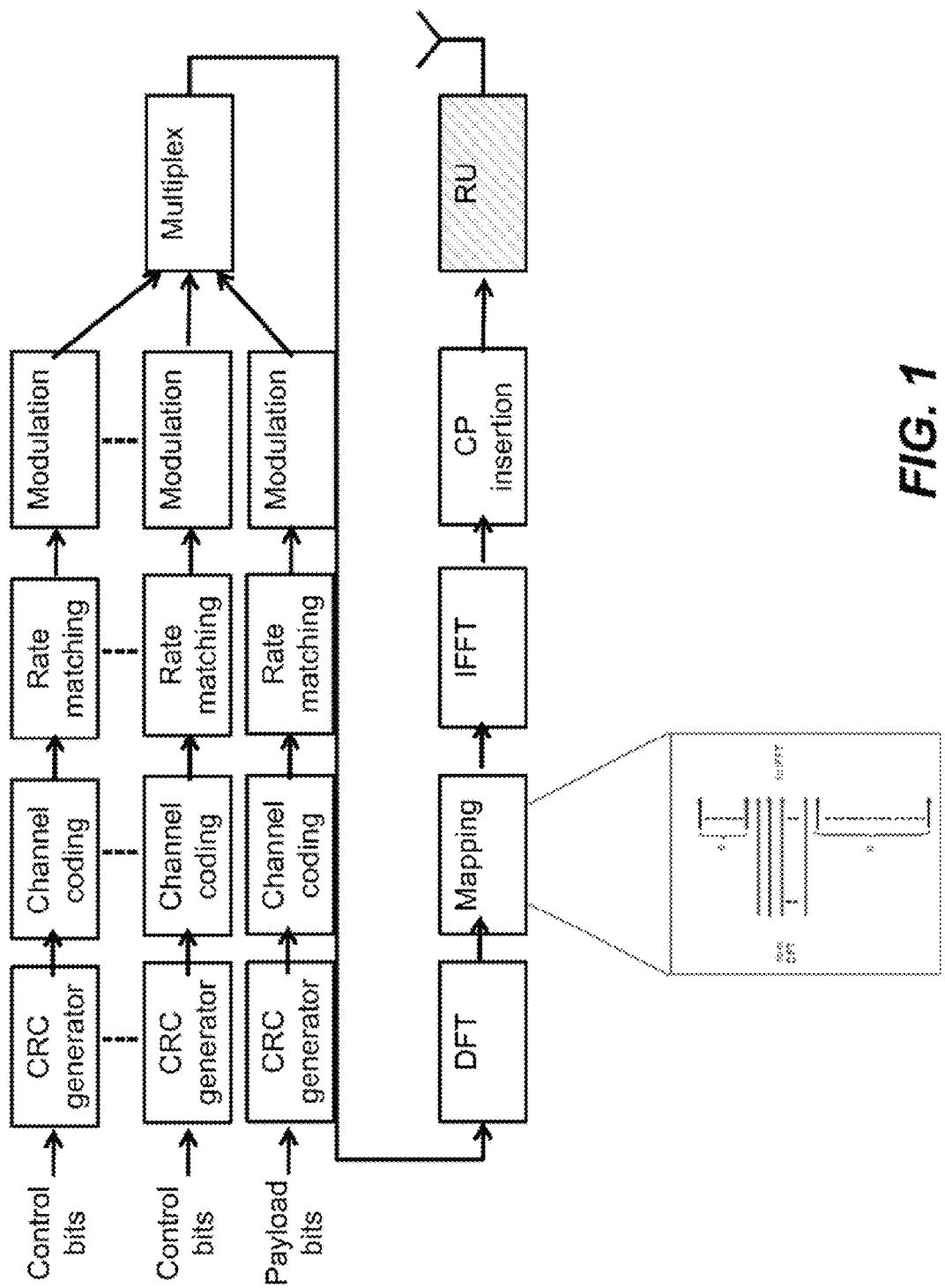
FIG. 1 is a block diagram illustrating an example of DFT-spread OFDM.

Disclosed is a new design of determining and signaling the beta offset values, e.g. UCI MSC offset values, when UCI is transmitted on PUSCH with shortened TTIs. This section presents solutions for controlling the coding rate of the UCI transmitted on sPUSCH.

Notations

The following notations are used throughout this section:
$\beta_{offset}^{PUSCH}$ and $\beta_{offset}^{sPUSCH}$ denote the MCS offset parameters for UCI on PUSCH and sPUSCH, respectively.

$\beta_{offset}^{HARQ-ACK}$, $\beta_{offset}^{RI}$ and $\beta_{offset}^{CQI}$ and are the MCS offset parameters for HARQ-ACK, RI and CQI/PMI, respectively, when they are transmuted on PUSCH. Those parameters are used as an input parameter for calculating the coding rate for each type of UCI on PUSCH.

$\beta_{offset}^{HARQ-ACK,sTTI}$, $\beta_{offset}^{RI,sTTI}$ and $\beta_{offset}^{CQI,sTTI}$ and are the MCS offset parameters for HARQ-ACK, RI and CQI/PMI, respectively, when they are transmitted on sPUSCH, and when, the MCS offset parameters are sTTI length independent. Those parameters are used as an input parameter for calculating the coding rate for each type of UCI on sPUSCH.

$\beta_{offset}^{HARQ-ACK,sTTI,i}$, $\beta_{offset}^{RI,sTTI,i}$ and $\beta_{offset}^{CQI,sTTI,i}$ are the MCS offset parameters for HARQ-ACK, RI and CQI/PMI, respectively, when they are transmitted on sPUSCH with a certain sTTI length, where the length of the sTTI is indicated by the index i. For example, i=0, 1, 2 corresponds to a sTTI length of 2, 4 and 7 symbols, respectively.

Those MCS offset parameters are used as an input parameter for calculating the coding rate for each type of UCI on sPUSCH.

$I_{offset}^{HARQ-ACK,sTTI}$ is the signaling index for configuring the MCS offsets for HARQ-ACK with no more than X HARQ-ACK bits and for single codeword sPUSCH transmissions.

$I_{offset,y}^{HARQ-ACK,sTTI}$ is the signaling index for configuring the MCS offsets for HARQ-ACK with more than X HARQ-ACK bits and for single code word sPUSCH transmissions.

$I_{offset}^{RI,sTTI}$ and $I_{offset}^{CQI,sTTI}$ are the signaling indices for configuring the MCS offsets for RI and CQI/PMI, respectively, and for the case of single code word sPUSCH transmissions.

$I_{offset,MC}^{HARQ-ACK,sTTI}$ is the signaling index for configuring the MCS offsets for HARQ-ACK with no more than X HARQ-ACK bits and for multiple codeword sPUSCH transmissions.

$I_{offset,MC}^{HARQ-ACK,sTTI}$ is the signaling index for configuring the MCS offsets for HARQ-ACK with more than X HARQ-ACK bits and for multiple code word sPUSCH transmissions.

$I_{offset,MC}^{RI,sTTI}$ and $I_{offset,MC}^{CQI,sTTI}$ are the signaling indices for configuring the MCS offsets for RI and CQI/PMI, respectively, and for the case of multiple code word sPUSCH transmissions.

In the above cases X can equal, for example, 22 or 11. Using two RM encoders would correspond to 22, and using a single RM encoder would correspond to 11. It is possible to have another value of X given another coding scheme for small info block sizes.

It is further possible to extend the above parameter into different sets in the subframe. For example two sets where one set is more heavily interfered than the other set and would therefor require another parameter setting.

Example Solutions

Example solutions are further discussed below. Certain solutions may reuse the legacy UCI MSC offset tables for UCI on sPUSCH (see e.g., Solutions 1, 2, 3). In certain embodiments, a legacy UCI MSC offset table may refer to a table existing in LTE Release 14 or earlier release. Other solutions may define different UCI MSC offset tables for UCI on sPUSCH (see e.g., Solutions 4 and 5).

Reuse the Legacy UCI MSC Offset Tables for UCI on sPUSCH

In an embodiment, the legacy MCS offset tables predefined for transmitting UCI on PUSCH are reused for transmitting UCI on sPUSCH. For example, Table 8.6.3-1, Table 8.6.3-2, and Table 8.6.3-3 in TS 36.213 v13.0.1 are reused for transmitting HARQ-ACK, RI and CQI/PMI on sPUSCH, respectively.

Solution 1:

In an embodiment, the same offset values listed in the tables are used for transmission the corresponding UCI on sPUSCH. Different signaling indices are used to configure the offset values of different types of UCI. Depending on the HARQ-ACK payload size, e.g., more than X bits or not, different signaling indices are to configure the offset values of HARQ-ACK transmission on sPUSCH.

In an embodiment, the higher layer indexes, used for configuring the MCS offset values for transmitting UCI on sPUSCH, is independent of the sTTI lengths. As an example, The sTTI UE uses the higher layer indexes $I_{offset}^{HARQ-ACK,sTTI}$ or $I_{offset,X}^{HARQ-ACK,sTTI}$, $I_{offset}^{RI,sTTI}$ and $I_{offset}^{CQI,sTTI}$ in the corresponding legacy MCS offset tables to determine $\beta_{offset}^{HARQ-ACK,sTTI}$, $\beta_{offset}^{RI,sTTI}$ and $\beta_{offset}^{CQI,sTTI}$ respectively, for single codeword sPUSCH transmissions.

The sTTI UE uses the higher layer indexes $I_{offset,MC}^{HARQ-ACK,sTTI}$ or $I_{offset,MC,X}^{HARQ-ACK,sTTI}$, $I_{offset,MC}^{RI,sTTI}$ and $I_{offset,MC}^{CQI,sTTI}$ in the corresponding legacy MCS offset tables to determine $\beta_{offset}^{HARQ-ACK,sTTI}$, $\beta_{offset}^{RI,sTTI}$ and $\beta_{offset}^{CQI,sTTI}$ respectively, for multiple codeword sPUSCH transmissions.

In another embodiment, different higher layer indexes are used for configuring the MCS offset values for transmitting UCI on sPUSCH with different sTTI lengths. As an example.

The sTTI UE uses the higher layer indexes $I_{offset}^{HARQ-ACT,sTTI,i}$ or $I_{offset,X}^{HARQ-ACK,sTTI,i}$, $I_{offset}^{RI,sTTI,i}$ and $I_{offset}^{CQI,sTTI,i}$ in the corresponding legacy MCS offset tables to determine $\beta_{offset}^{HARQ-ACK,sTTI,i}$, $\beta_{offset}^{RI,sTTI,i}$ and $\beta_{offset}^{CQI,sTTI,i}$ respectively; for single codeword sPUSCH transmissions with a certain sTTI length indicated by the index i.

The sTTI UE uses the higher layer indexes $I_{offset,MC}^{HARQ-ACK,sTTI,i}$ or $I_{offset,MC,X}^{HARQ-ACK,sTTI,i}$, $I_{offset,MC}^{RI,sTTI,i}$ and $I_{offset,MC}^{CQI,sTTI,i}$ in the corresponding legacy MCS offset tables to determine $\beta_{offset}^{HARQ-ACK,sTTI,i}$, $\beta_{offset}^{RI,sTTI,i}$ and $\beta_{offset}^{CQI,sTTI,i}$ respectively, for multiple codeword sPUSCH transmissions with a certain sTTI length indicated by the index i.

Solution 2:

In an embodiment, the MCS offset values used for transmitting UCI on sPUSCH is obtained by applying a scaling factor on the MCS offset values pre-defined in the legacy tables. Different signaling indices are used to configure the offset values of UCI on sPUSCH.

In an embodiment, the higher layer indexes, used for configuring the MCS offset values for transmitting UCI on sPUSCH, is independent of the sTTI lengths. As an example.

For single codeword sPUSCH transmissions, the sTTI UE first uses the higher layer indexes $I_{offset}^{HARQ-ACK,sTTI}$ or $I_{offset,X}^{HARQ-ACK,sTTI}$, $I_{offset}^{RI,sTTI}$ and $I_{offset}^{CQI,sTTI}$ in the corresponding legacy MCS offset tables to obtain the mapped offset value for HARQ-ACK, RI, CQI; then, the offset values $\beta_{offset}^{HARQ-ACK,sTTI}$, $\beta_{offset}^{RI,sTTI}$ and $\beta_{offset}^{CQI,sTTI}$ are determined by applying a scaling factor on the values obtained from the table mapping.

For multiple codeword sPUSCH transmissions, the sTTI UE first uses the higher layer indexes $I_{offset,MC}^{HARQ-ACK,sTTI}$ or $I_{offset,MC,X}^{HARQ-ACK,sTTI}$, $I_{offset,MC}^{RI,sTTI}$ and $I_{offset,MC}^{CQI,sTTI}$ in the corresponding legacy MCS offset tables to obtain the mapped offset values for HARQ-ACK, RI, CQI; then, the offset values $\beta_{offset}^{HARQ-ACK,sTTI}$, $\beta_{offset}^{RI,sTTI}$ and $\beta_{offset}^{CQI,sTTI}$ are determined by applying a scaling factor on the values obtained from the table mapping.

In another embodiment, different higher layer indexes are used for configuring the MCS offset values for transmitting UCI on sPUSCH with different sTTI lengths. As an example, For single codeword sPUSCH transmissions with a certain sTTI length indicated by the index i, the sTTI UE first uses the higher layer indexes $I_{offset}^{HARQ-ACK,sTTI,i}$ or $I_{offset,X}^{HARQ-ACK,sTTI,i}$, $I_{offset}^{RI,sTTI,i}$ and $I_{offset}^{CQI,sTTI,i}$ in the corresponding legacy MCS offset tables to obtain the mapped offset values for HARQ-ACK, RI, CQI; then, the offset values $\beta_{offset}^{HARQ-ACK,sTTI,i}$, $\beta_{offset}^{RI,sTTI,i}$ and $\beta_{offset}^{CQI,sTTI,i}$ are determined by applying a scaling factor on the values obtained from the table mapping.

For multiple codeword sPUSCH transmissions with a certain sTTI length indicated by the index i, the sTTI UE first uses the higher layer indexes $I_{offset,MC}^{HARQ-ACK,sTTI,i}$ or $I_{offset,MC,X}^{HARQ-ACK,sTTI,i}$, $I_{offset,MC}^{RI,sTTI,i}$ and $I_{offset,MC}^{CQI,sTTI,i}$ in the corresponding legacy MCS offset tables to obtain the mapped offset values for HARQ-ACK, RI, CQI; then, the offset values $\beta_{offset}^{HARQ-ACK,sTTI,i}$, $\beta_{offset}^{RI,sTTI,i}$ and $\beta_{offset}^{CQI,sTTI,i}$ are determined by applying a scaling factor on the values obtained from the table mapping.

Solution 3:

In an embodiment, the MCS offset values used for transmitting UCI on sPUSCH is obtained by applying a scaling factor on the MCS offset values pre-defined in the legacy tables. The same signaling index that are used for configuring the offset values of UCI on PUSCH are used for determining the offset values of UCI on sPUSCH.

In an embodiment, the scaling factor, used for configuring the MCS offset values for transmitting UCI on sPUSCH, is independent of the sTTI lengths. As an example, For single codeword sPUSCH transmissions, the sTTI UE first uses the higher layer indexes or $I_{offset}^{HARQ-ACK}$ or $I_{offset,X}^{HARQ-ACT}$, $I_{offset}^{RI}$ and $I_{offset}^{CQI}$ in the corresponding legacy MCS offset tables to obtain the mapped offset values for HARQ-ACK, RI, CQI; then, the offset values $\beta_{offset}^{HARQ-ACK,sTTI}$, $\beta_{offset}^{RI,sTTI}$ and $\beta_{offset}^{CQI,sTTI}$ are determined by applying a scaling factor on the values obtained from the table mapping.

For multiple codeword sPUSCH transmissions, the sTTI UE first uses the higher layer indexes $I_{offset,MC}^{HARQ-ACK}$ or $I_{offset,MC,X}^{HARQ-ACK}$, $I_{offset,MC}^{RI}$ and $I_{offset,MC}^{CQI}$ in the corresponding legacy MCS offset tables to obtain the mapped offset values for HARQ-ACK, RI, CQI; then, the offset values $\beta_{offset}^{HARQ-ACK,sTTI}$, $\beta_{offset}^{RI,sTTI}$ and $\beta_{offset}^{CQI,sTTI}$ are determined by applying a scaling factor on the values obtained from the table mapping.

In another embodiment, different scaling factors are used for configuring the MCS offset values for transmitting UCI on sPUSCH with different sTTI lengths.

Define Different UCI MSC Offset Tables for UCI on sPUSCH

Solution 4:

In an embodiment, new tables are defined for transmitting UCI on sPUSCH, where each type of UCI, i.e. HARQ-ACK, RI and CQI/PMI has a single pre-defined new MCS offset table, which is independent of the sTTI lengths. The signaling methods presented in Solution 1 can be used for configuring the MCS offset values for the sTTI UE.

Solution 5:

In an embodiment, new tables are defined for transmitting UCI on sPUSCH, where each type of UCI, i.e. HARQ-ACK, RI and CQI/PMI has several pre-defined new MCS offset tables, with each table mapped to a certain sTTI length. The signaling methods presented, in Solution 1 can be used for configuring the MCS offset values for the sTTI UE.

For Solutions 4 and 5:

The new tables can be defined by choosing a subset of the MCS offset indices/values from a complete set of indices/values listed in the legacy tables.

MCS offset value signaling methods:

The eNB determines the value of the MCS offset by sending an MCS offset index over RRC. The same signaling methods presented for method 1 can be used for solutions 4 and 5.

The eNB signals the whole new table to a UE over RRC, and the UE selects one of the MCS offset, values listed in the new table to apply.

The MCS offset value is selected based on a pre-defined rule and/or information about UCI to be transmitted in this sPUSCH.

The pre-defined rides can be that the UE determines the MCS offset value based on the UCI payload, or that the UE determines the MCS offset value based on the ratio between UCI payload and data payload, or that the UE determines the MCS offset value based on the MCS used for the data transmission on the sPUSCH.

FIGS. 3-10

A more complete and thorough understanding of the present embodiments, including Solutions 1-5 discussed above, may be acquired by referring to FIGS. 3-10, discussed below. Embodiments of the present disclosure may be implemented in any suitable network, such as the wireless network 100 illustrated in FIG. 3. Wireless network 100 includes a plurality of radio nodes (e.g., 110 and 120). A radio node may refer to a wireless device 110 (which may be referred to interchangeably as user equipment, UE) or a radio access node 120 (e.g., enhanced Node Bs (eNBs), gNBs, etc.). In the example wireless network 100, radio access node 120 connects to one or more core network nodes 130 via an interconnecting network 125. Wireless devices 110 within coverage area 115 may each be capable of communicating directly with radio access nodes 120 over a wireless interface. In certain embodiments, wireless devices may also be capable of communicating with each other via device-to-device (D2D) communication.

As an example, wireless device 110a may communicate with radio access node 120a over a wireless interface. That is, wireless device 110a may transmit wireless signals and/or receive wireless signals from radio access node 120a. The wireless signals may contain voice traffic, data traffic, control signals, and/or any other suitable information. Signals communicated in the direction from wireless device 110 to radio access node 120 may be referred to as uplink signals, and signals communicated in the direction from radio access node 120 to wireless device 110 may be referred to as downlink signals. In some embodiments, an area of wireless signal coverage associated with a radio access node 120 may be referred to as a cell.

As mentioned above, in some embodiments wireless device 110 may be interchangeably referred to by the non-limiting term user equipment (UE). Wireless device 110 can be any type of wireless device capable of communicating with network node or another UE over radio signals. The UE may also be radio communication device, target device, device to device (D2D) UE, machine type UE or UE capable of machine-to-machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc. An example embodiment of wireless device 110 is described in more detail below with respect to FIG. 4.

In some embodiments, generic terminology "network node" is used. It can be any kind of network node which may comprise of a radio network node such as radio access node 120 (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., mobile management entity, MME, self-organizing network node, SON node, a coordinating node, positioning node, minimization of drive test node, MDT node, etc.), or even an external node (e.g., 3rd party node, a node external to the current network), etc. The network node may also comprise test equipment. The term "radio node" may be used to denote a UE (e.g., wireless device 110) or a radio network node (e.g., radio access node 120). An example embodiment of radio access node 120 is described in more detail below with respect to FIG. 3.

In certain, embodiments, radio access nodes 120 may interface with a radio network controller. The radio network controller may control radio access nodes 120 and may provide certain radio resource management functions, mobility management functions, and/or other suitable functions. In certain embodiments, the functions of the radio network controller may be included in radio access node 120. The radio network controller may interface with a core network node 130. In certain embodiments, the radio network-controller may interface with the core network node 130 via an interconnecting network 125.

Thy interconnecting network 125 may refer to any interconnecting system capable of transmitting audio, video, signals, data, messages, or any combination of the preceding. The interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 130 may manage the establishment of communication sessions and various other functionalities for wireless devices 110. Examples of core network node 130 may include mobile switching center (MSC), MME, serving gateway (SGW), packet data network gateway (PGW), operation and maintenance (O&M), operations support system (OSS), SON, positioning node (e.g. Enhanced Serving Mobile Location Center, E-SMLC), MDT node, etc. Wireless devices 110 may exchange certain signals with the core network node using the non-access stratum layer. In non-access stratum signaling, signals between wireless devices 110 and the core network node 130 may be transparently passed through the radio access network. In certain embodiments, radio access nodes 120 may interface with one or more network nodes over an internode interface. For example, radio access nodes 120a and 120b may interface over an X2 interface.

Figure 3:
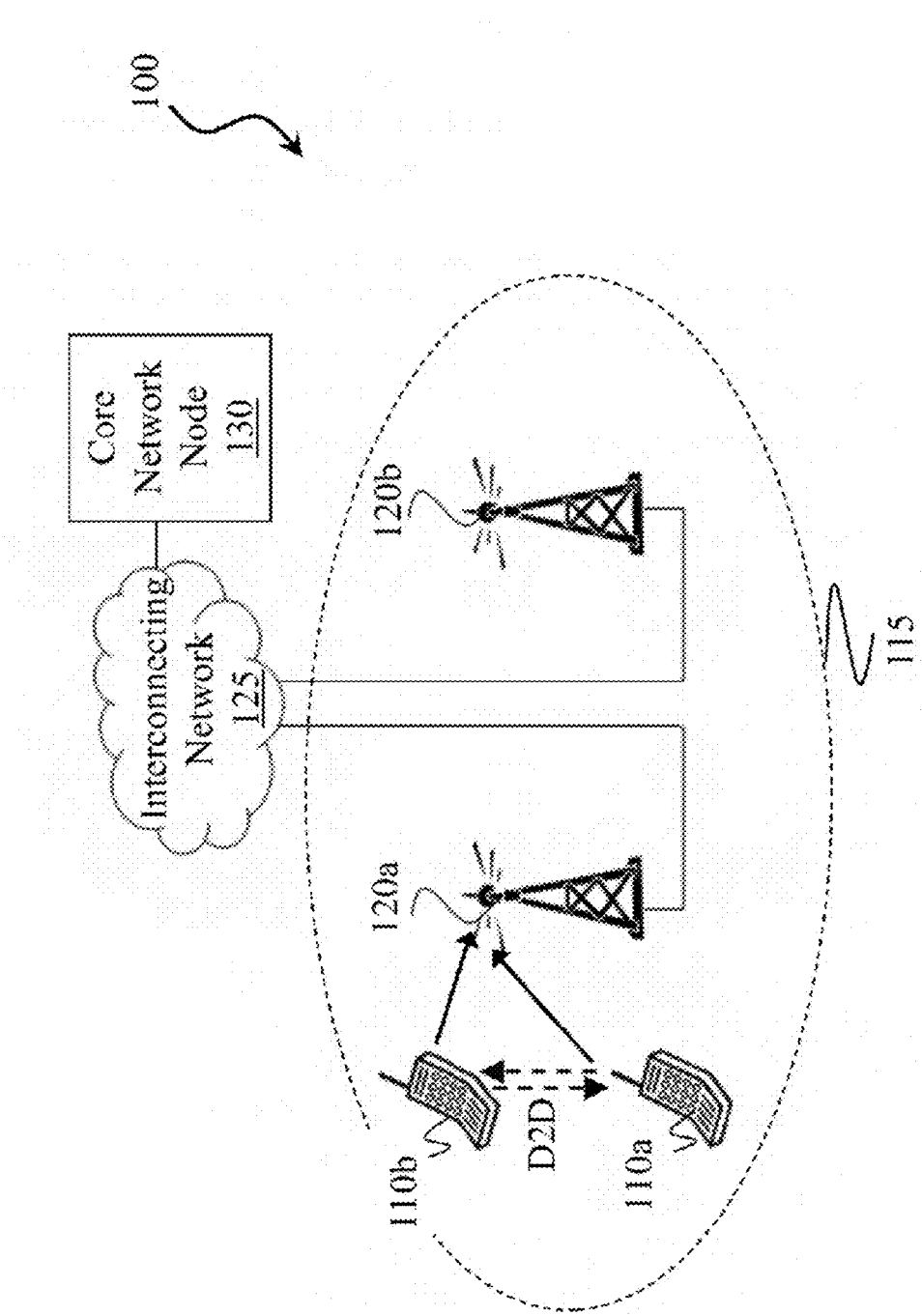
FIG. 3 is a block diagram illustrating an example of a wireless network, in accordance with certain embodiments of the present disclosure.

Although FIG. 3 illustrates a particular arrangement of network 100, the present disclosure contemplates that the various embodiments described herein may be applied to a variety of networks having any suitable configuration. For example, network 100 may include any suitable number of wireless devices 110 and radio access nodes 120, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR and/or LTE, the embodiments are applicable to any RAT, such as Universal Mobile Telecommunications System Terrestrial Radio Access Network (UTRA), enhanced UTRA (E-UTRA), narrow band internet of things (NB-IoT), WiFi, Bluetooth, next generation RAT (MR, NX), 4G, 5G, LTE FDD/TDD, Wideband Code Division Multiple Access (WCDMA), High Speed Packet Access (HSPA), Global System for Mobile Communication (GSM), GSM Edge Radio Access Network (GERAN), WLAN, CDMA2000, etc.

Figure 4:
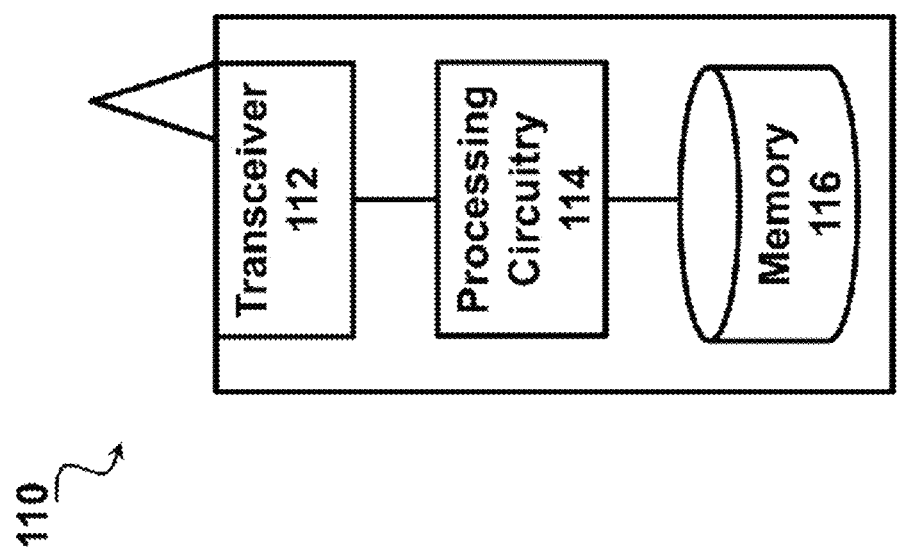
FIG. 4 is a block diagram illustrating an example of a wireless device, in accordance with certain embodiments of the present disclosure.

FIG. 4 is a block diagram of an exemplary wireless device 110, in accordance with certain embodiments. Wireless device 110 includes a transceiver 112, processing circuitry 114 (which may include one or more processors), and memory 116. In some embodiments, the transceiver 112 facilitates transmitting wireless signals to and receiving wireless signals from radio access node 120 (e.g., via an antenna), the processing circuitry 114 executes instructions to provide some or all of the functionality described above as being provided by wireless device 110, and the memory 116 stores the instructions for execution by the processing circuitry.

The processing circuitry 114 may include any suitable combination of hardware and software implemented in one or more modules to execute instructions and manipulate data to perform some or all of the described functions of wireless device 110, such as the functions of wireless device 110 described above. In certain embodiments, the processing circuitry 114 may be operable to perform the functions of wireless device 110 discussed with respect to FIG. 6, such as obtaining a beta-offset value based on control information received from a network node and using the beta-offset value for an uplink transmission having an sTTI. In some embodiments, the processing circuitry 114 may include, for example, one or more computers, one or more central processing units (CPUs), one or more microprocessing circuitry, one or more applications, one or more application specific integrated circuits (ASICs), one or more field programmable gate arrays (FPGAs) and/or other logic.

The memory 116 is generally operable to store instructions, such as a computer program, software, an application including one or more of logic, rules, algorithms, code, tables, etc. and/or other instructions capable of being executed by processing circuitry 114. Examples of memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or nonvolatile, non-transitory computer-readable and/or computer-executable memory devices that store information, data, and/or instructions that may be used by the processing circuitry of wireless device 110.

Other embodiments of wireless device 110 may include additional components beyond those shown in FIG. 4 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry. Input devices include mechanisms for entry of data into wireless device 110. For example, input devices may include input mechanisms, such as a microphone, input elements, a display, etc. Output devices may include mechanisms for outputting data in, audio, video and/or hard copy format. For example, output devices may include a speaker, a display, etc.

Figure 5:
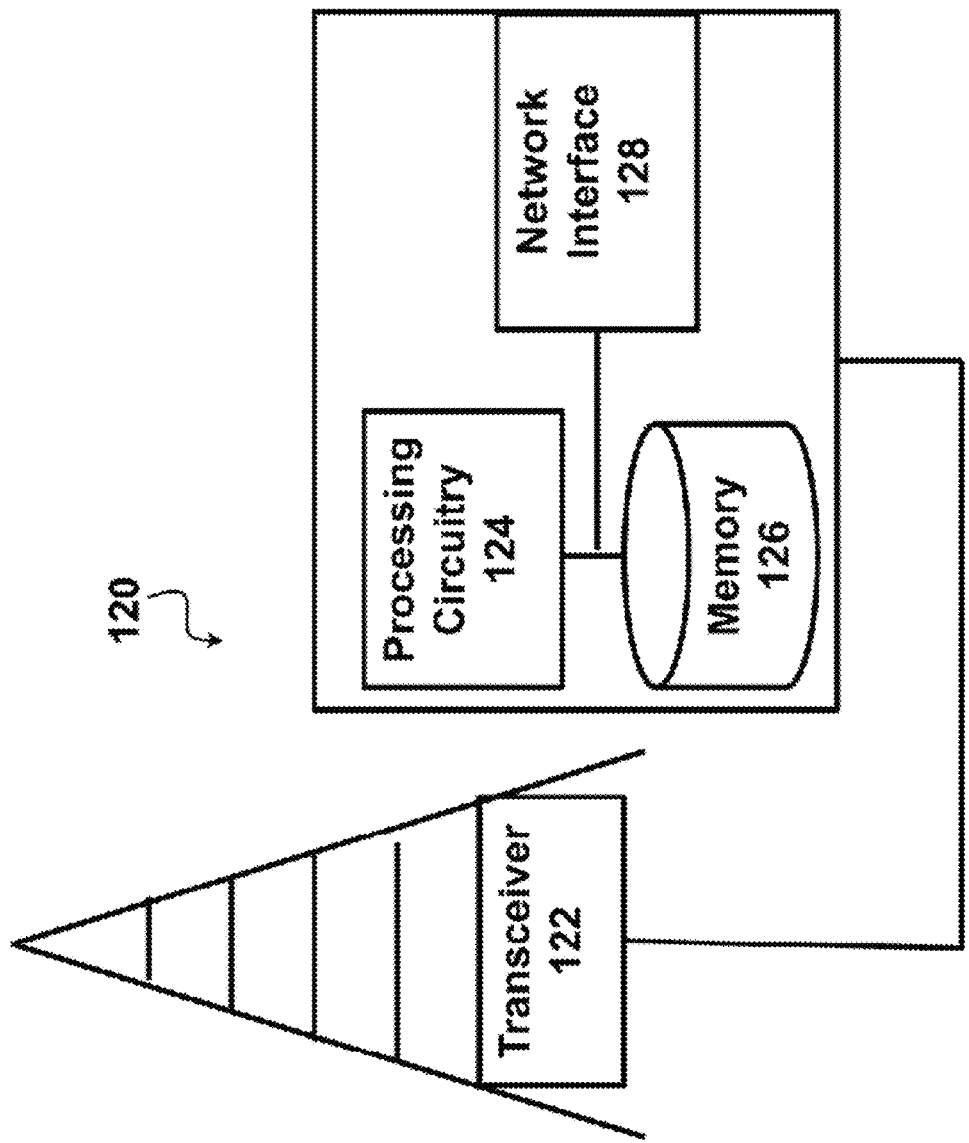
FIG. 5 is a block diagram illustrating an example of a network node, in accordance with certain embodiments of the present disclosure.

FIG. 5 is a block diagram of an exemplary radio access node 120, in accordance with certain embodiments. Radio access node 120 may include one or more of a transceiver 122, processing circuitry 124 (which may include one or more processors), memory 126, and network interface 128. In some embodiments, the transceiver 122 facilitates transmitting wireless signals to and receiving wireless signals from wireless device 110 (e.g., via an antenna), the processing circuitry 124 executes instructions to provide some or all of the functionality described above as being provided by a radio access node 120 (or, more generally, by a network node), the memory 126 stores the instructions for execution by the processing circuitry 124, and the network interface 128 communicates signals to backend network, components, such as a gateway, switch, router, Internet, Public Switched Telephone Network (PSTN), core network nodes or radio network controllers, etc.

The processing circuitry 124 may include any suitable combination of hardware and software implemented in one or more modules to execute instructions and manipulate data to perform some or all of the described functions of radio access node 120, such as those described above. In certain embodiments, the processing circuitry 124 may be operable to perform the functions of a network node discussed with respect to FIG. 6, such as communicating control information that a wireless devices uses to obtain a beta-offset value for an uplink transmission having an sTTI. In some embodiments, the processing circuitry 124 may include, for example, one or more computers, one or more central processing units (CPUs), one or more microprocessing circuitry, one or more applications, one or more application specific integrated circuits (ASICs), one or more field programmable gate arrays (FPGAs) and/or other logic.

The memory 126 is generally operable to store instructions, such as a computer program, software, an application including one or more of logic, rules, algorithms, code, tables, etc. and/or other instructions capable of being executed by processing circuitry 124. Examples of memory 126 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 128 is communicatively coupled to the processing circuitry 124 and may refer to any suitable device operable to receive input for radio access node 120, send output from radio access node 120, perform suitable processing of the input or output or both, communicate to other devices, or any combination of the preceding. The network interface may include appropriate hardware (e.g., port, modem, network interface card, etc.) and software, including protocol conversion and data processing capabilities, to communicate through a network.

Other embodiments of radio access node 120 may include additional components beyond those shown in FIG. 5 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Processing circuitry, interfaces, and memory similar to those described with respect to FIGS. 4-5 may be included in other network, nodes (such as core network node 130). Other network nodes may optionally include or not include a wireless interface (such as the transceiver described in FIGS. 4-5).

Figure 6:
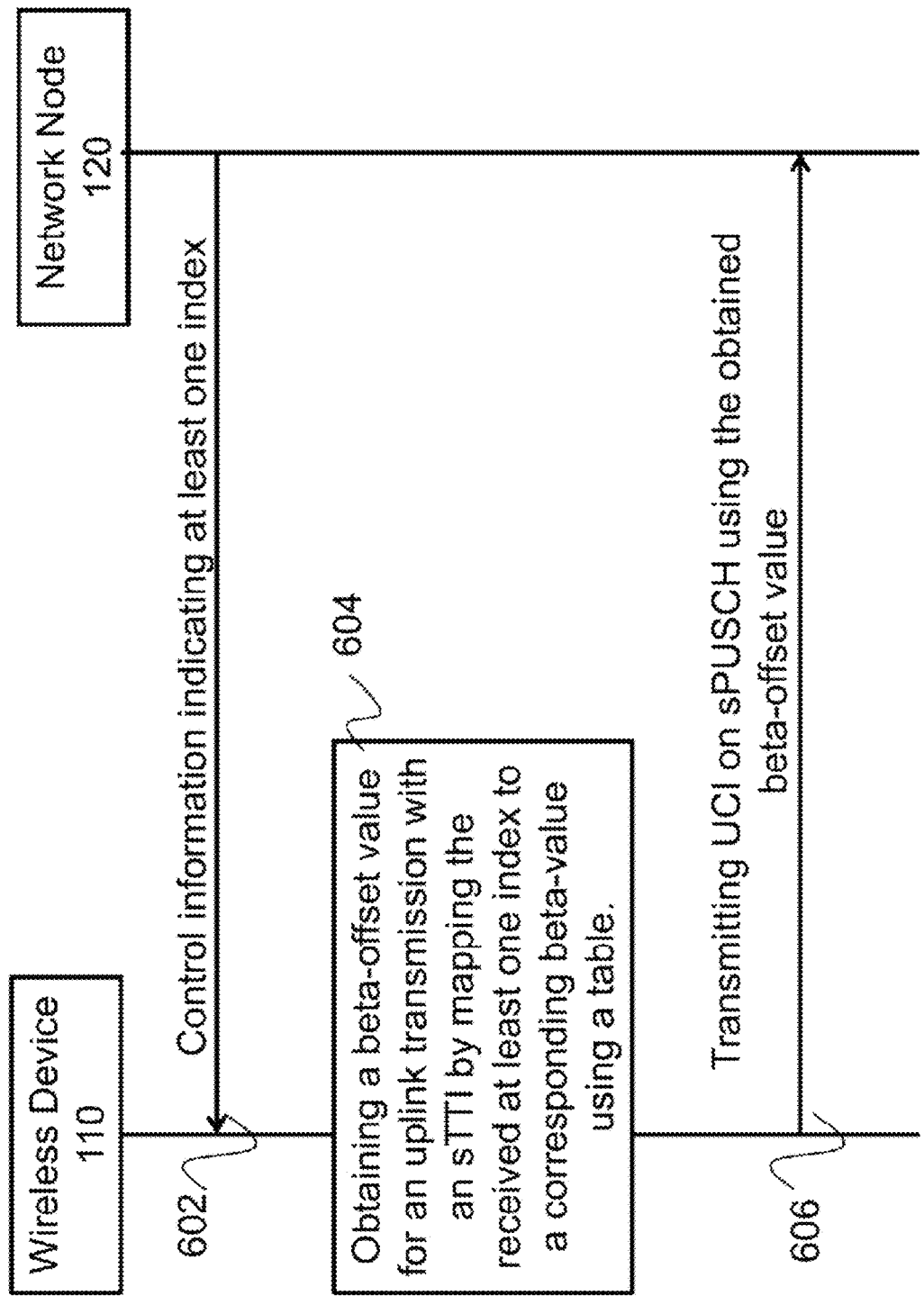
FIG. 6 is a flow diagram illustrating an example of a method for determining a beta-offset, in accordance with certain embodiments.

FIG. 6 is a flow diagram illustrating an example of a method for sending control information to a wireless device 110 operable to transmit uplink transmissions using a shortened transmission time interval (sTTI). In certain embodiments, the duration of the sTTI is less than the duration of a normal TTI specified in long term evolution (LTE) release 8. For example, a normal TTI specified in release 8 may have a duration of 1 ms, whereas an sTTI may have a duration that is shorter by any amount. As another example, certain embodiments of a normal TTI specified in release 8 may comprise 14 OFDM or SC-FDMA symbols, whereas an sTTI may comprise fewer symbols.

At step 602, a network node (such as radio access node 120) communicates control information to one or more wireless devices 110 for indicating a beta-offset value to a wireless device 110 transmitting uplink transmissions using an sTTI. The beta-offset value may refer to any of several kinds of beta-offset values. One example of a beta-offset is MCS on sPUSCH, generally denoted $\beta_{offset}^{sPUSCH}$. The notations section above provides additional examples of denoting MCS specific to HARQ-ACK, RI, and CQI/PMI.

The control information communicated in step 602 indicates at least one index, and the beta-offset value is obtained based on the indicated index. In certain embodiments, the control information indicating the index is sent/received via radio resource control (RRC) signaling.

The network node may determine the index(es) to indicate in the control information in any suitable manner. In some embodiments, the network node determines the index(es) independently of the length of the sTTI. Examples of indexes determined independently of the length of the sTTI include indexes $I_{offset}^{HARQ-ACK}$, $I_{offset,X}^{HARQ-ACK}$, $I_{offset}^{RI,sTTI}$, $I_{offset}^{CQI,sTTI}$, $I_{offset,MC}^{HARQ-ACK,sTTI}$, $I_{offset,MC,X}^{HARQ-ACK,sTTI}$, $I_{offset,MC}^{RI,sTTI}$, $I_{offset,MC}^{CQI,sTTI}$, $I_{offset}^{HARQ-ACK}$, $I_{offset,X}^{HARQ-ACK}$, $I_{offset}^{RI}$, $I_{offset}^{CQI}$, $I_{offset,MC}^{HARQ-ACK}$, $I_{offset,MC,X}^{HARQ-ACK}$, $I_{offset,MC}^{RI}$, and $I_{offset,MC}^{CQI}$ discussed above.

In other embodiments, the network node determines the index based on the length of the sTTI. Examples of indexes based on the length of the sTTI include $I_{offset}^{HARQ-ACK,sTTI,i}$, $I_{offset,X}^{HARQ-ACK,sTTI,i}$, $I_{offset}^{RI,sTTI,i}$, $I_{offset}^{CQI,sTTI,i}$, $I_{offset,MC}^{HARQ-ACT,sTTI,i}$, $I_{offset,MC,X}^{HARQ-ACT,sTTI,i}$, $I_{offset,MC}^{RI,sTTI,i}$, and $I_{offset,MC}^{CQI,sTTi,i}$ discussed above (wherein i indicates the length of the sTTI).

In some embodiments, network node determines the index(es) to indicate in the control information based on a payload size of a hybrid automatic repeat request-acknowledgement (HARQ-ACK) transmission. As discussed above with respect to Solution 1, depending on the HARQ-ACK payload size, e.g., more than X bits or not, different signaling indices are to configure the offset values of HARQ-ACK transmission on sPUSCH.

In certain embodiments, the control information may also indicate whether to apply scaling to the beta-offset value that maps to the indicated index. Optionally, the scaling can be according to a scaling factor that is pre-defined based on the length of the sTTI. In certain embodiments, the control information communicated by the network node comprises the scaling factor to apply to the beta-offset value that maps to the indicated index.

In certain embodiments, the control information from the network node indicates more than one index. This allows the wireless device to select which beta-offset to apply from among the beta-offset values corresponding to the indicated indexes.

At step 604, wireless device 110 obtains the beta-offset value based on the index(es) received in step 602. In certain embodiments, the at least one index received in step 602 is selected from a plurality of indexes, each of which maps to a corresponding beta-offset value according to a table. Wireless device 110 obtains the beta-offset value by using the table to determine the beta-offset value that maps to the index received in step 602.

Any suitable table (or set of tables) can be used to map an index to a corresponding beta-offset value. In certain embodiments, the table is configured to be the same as an existing table for transmitting UCI on a PUSCH with a normal TTI of 1 millisecond (ms), these existing tables currently used for normal ("legacy") TTI of 1 ms also being referred to as "legacy tables". For example, in certain embodiments, the existing table is configured according to LTE Release 14 or earlier release. That is, certain embodiments can reuse one or more pre-defined tables for transmitting UCI on a PUSCH with a non-shortened TTI.

In certain embodiments, the table comprises both existing indexes defined for normal TTI of 1 millisecond (ms) and new indexes that have been defined for sTTI and added to the existing table. In this example, the one or more index(es) communicated in step 602 would include one of the indexes defined for sTTI so that wireless device 110 can obtain the beta-offset value to use for uplink transmissions using an sTTI.

In certain embodiments, the table mapping the index to the beta-offset value reuses fewer than all of the existing indices of an existing table. As an example, suppose an existing table includes ten rows, the table could reuse five of the rows and need not reuse the other five rows. Thus, new tables can be defined by choosing a subset of the MCS offset indices/values from a complete set of indices/values listed in the legacy tables.

In certain embodiments, the table comprises at least one index corresponding to a beta-offset value for transmitting UCI on the sPUSCH with the sTTI. Such index is different than any index corresponding to a beta-offset value for transmitting UCI on the PUSCH with the normal TTI of 1 ms.

In certain embodiments, the table used is common for sTTI and normal TTI of 1 millisecond (ms), and at least one index in the table is specifically for communication using sTTI.

In certain embodiments, the table is selected from a plurality of tables and the control information indicates the selected table. For example, in certain embodiments, the plurality of tables comprise different tables for different types of UCI (e.g., HARQ-ACK, RI or CQI/PMI). A first table can be associated with a first type of UCI, and a second table can be associated with a second type of UCI. The beta-offset value in the first table can be independent of the length of the sTTI for the first type of UCI, or the beta-offset value in the first table can depend on the length of the sTTI for the first type of UCI.

At step 606, wireless device 110 transmits UCI using the obtained beta-offset value. The UCI is transmitted on sPUSCH. As an example, in certain embodiments, the beta-offset value is a modulation and coding scheme (MCS) offset for UCI being sent on sPUSCH.

Figure 7:
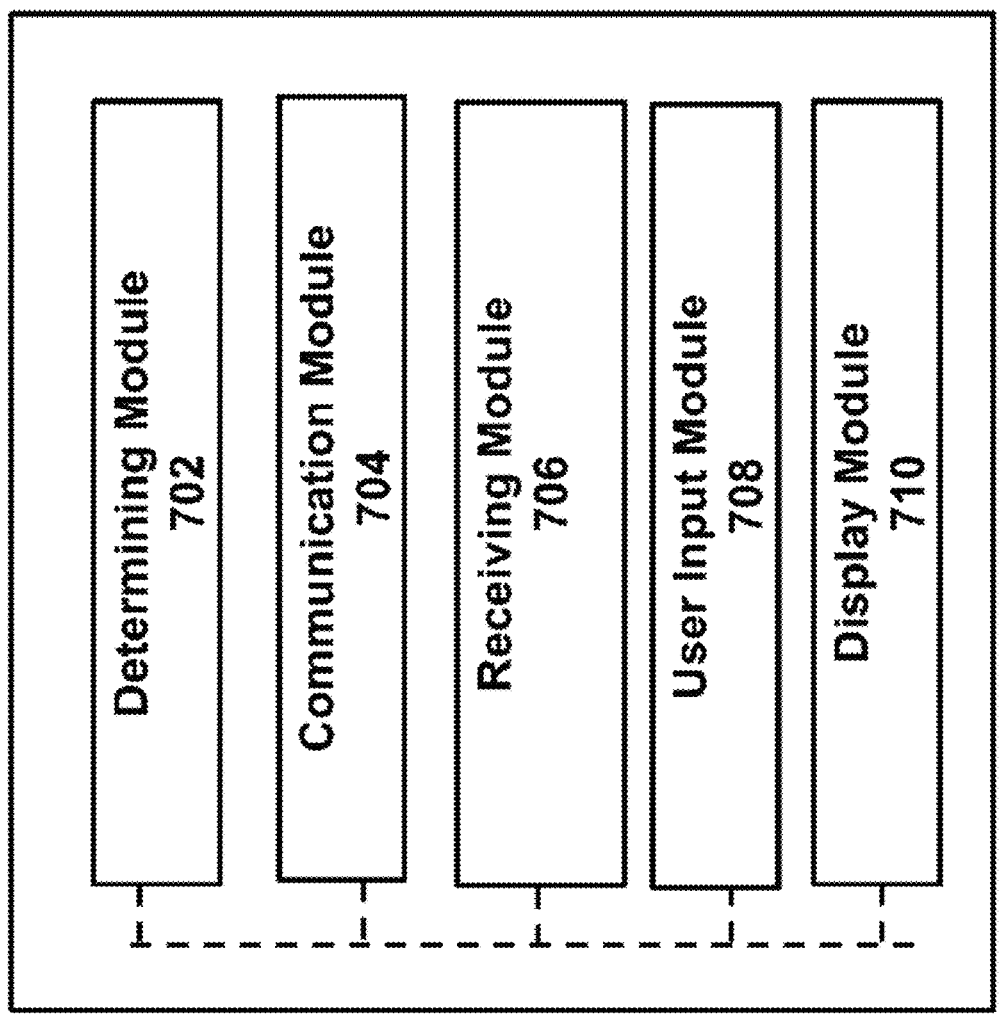
FIG. 7 is a block diagram illustrating an example of a components of a wireless device, in accordance with certain embodiments.

FIG. 7 illustrates examples of modules that can be included in wireless device 110. In certain embodiments, wireless device 110 may include any one or more of determining module(s) 702, communication module(s) 704, receiving module(s) 706, user input module(s) 708, display module(s) 710, and/or other suitable modules. The functionality of the modules may be integrated in a single component or separated among several components in any suitable manner. In certain embodiments, one or more of the modules may be implemented using processing circuitry 114 described with respect to FIG. 4.

The determining module 702 may perform the processing functions of wireless device 110, including any of the wireless device functionality to support the embodiments described herein, such as obtaining a beta-offset value based on an index received from a network node. As one example, the determining module 702 may obtain the beta-offset value by using a table to map the received index to a corresponding beta-offset value.

The determining module 702 may include or be included in processing circuitry 114 described above in relation to FIG. 4. The determining module 702 may include analog and/or digital circuitry configured to perform any of the functions of the determining module 702 and/or processing circuitry 114 described above. The functions of the determining module 702 described above may, in certain embodiments, be performed in one or more distinct modules.

The communication module 704 may perform the transmission functions of wireless device 110. For example, in certain embodiments the communication module 704 may communicate uplink transmissions to the network node. Certain uplink transmissions may comprise UCI transmitted on the sPUSCH according to the obtained beta-offset value. The communication module 704 may include a transmitter and/or a wireless interface, such as wireless interface 112 described above in relation to FIG. 4. The communication module 704 may include circuitry configured to wirelessly transmit messages and/or signals, in particular embodiments, the communication module 704 may receive messages and/or signals for transmission from the determining module 702. In certain embodiments, the functions of the communication module 704 described above may be performed in one or more distinct modules.

The receiving module 706 may perform the receiving functions of wireless device 110. For example, the receiving module 706 may receive control information from a network node (e.g., radio access node 120). The control information may comprise one or more index(es) for obtaining the beta-offset value. The receiving module 706 may include a receiver and or a wireless interface, such as wireless interface 112 described above in relation to FIG. 4. The receiving module may include circuitry configured to wirelessly receive messages and/or signals. In certain embodiments, the receiving module may include circuitry (which may comprise one or more interfaces) configured to receive information from other circuitry within wireless device 110. As an example, processing circuitry 114 may use internal interface(s) to receive information from memory 116 of wireless device 110. As another example, a higher layer process of wireless device 110 may be configured to receive signals from a lower layer process of wireless device 110 via one or more internal interfaces. In particular embodiments, the receiving module 706 may communicate received messages and or signals to the determining module 702. The functions of the receiving module 706 described above may, in certain embodiments, be performed in one or more distinct modules.

In certain embodiments, wireless device 110 may optionally include a user input module 708 that may receive user input intended for wireless device 110. For example, the user input 708 module may receive key presses, button presses, touches, swipes, audio signals, video signals, and/or any other appropriate signals. The user input module 708 may include one or more keys, buttons, levers, switches, touchscreens, microphones, and/or cameras. The user input module 708 may communicate received signals to the determining module 702. The functions of the user input module 708 described above may, in certain embodiments, be performed in one or more distinct modules.

In certain embodiments, wireless device 110 may optionally include a display module 710, which may present signals on a display of wireless device 110. The display module 710 may include the display and/or any appropriate circuitry and hardware configured to present signals on the display. The display module 710 may receive signals to present on the display from the determining module 702. The functions of the display module 710 described above may, in certain embodiments, be performed in one or more distinct modules.

Each module depicted in FIG. 7 may include any suitable configuration of hardware and/or software. Wireless device 110 may include additional modules beyond those shown in FIG. 7 that may be responsible for providing any suitable functionality, including any of the functionality described above and/or any additional functionality (including any functionality necessary to support the various solutions described herein).

In certain embodiments, some or all of the modules shown in FIG. 7 can be combined with one or more modules shown in FIG. 4. As an example, certain embodiments may combine at least some of the functionality of the processing circuitry (FIG. 4) with the determining module (FIG. 7). As another example, certain embodiments may combine at least some of the functionality of the wireless interface (FIG. 4) with the communication and/or receiving modules (FIG. 7).

Figure 8:
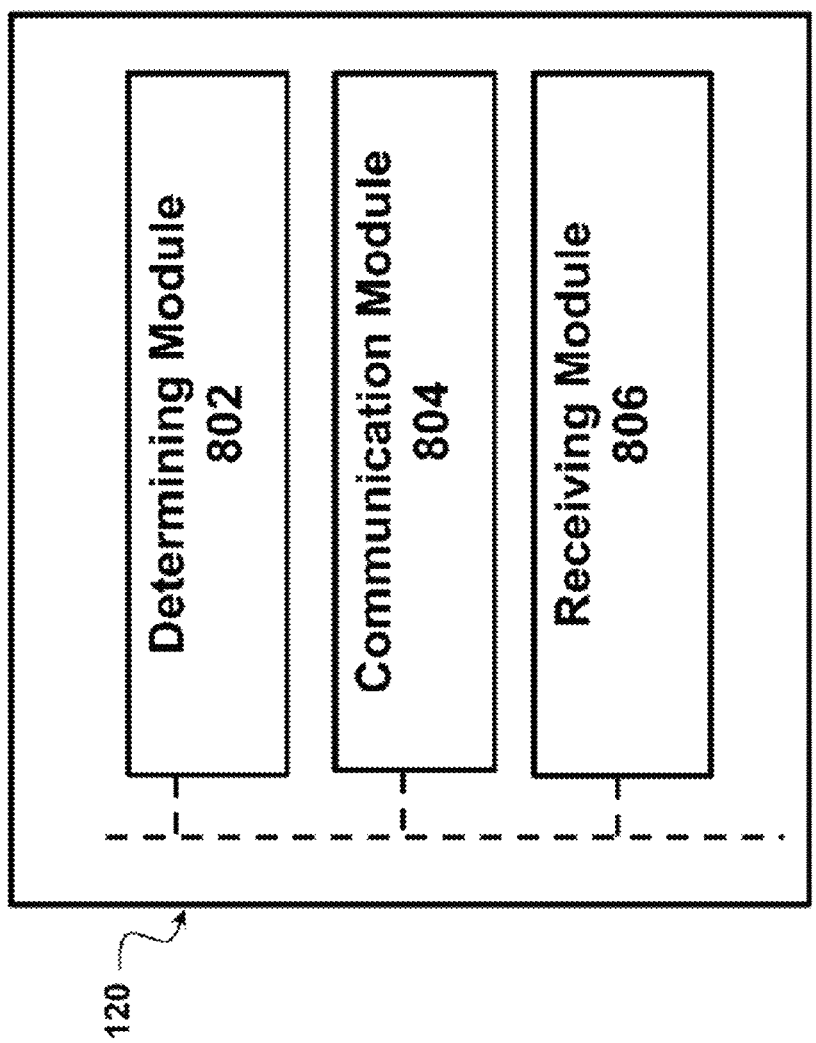
FIG. 8 is a block diagram illustrating an example of a components of a network node, in accordance with certain embodiments.

FIG. 8 illustrates examples of modules that can be included in a network node (such as radio access node 120). In certain embodiments, network node may include any one or more of determining module(s) 802, communication module(s) 804, receiving module(s) 806, and/or other suitable modules. The functionality of the modules may be integrated in a single component or separated among several components in any suitable manner. In certain embodiments, one or more of the modules may be implemented using processing circuitry 124 described with respect to FIG. 5.

The determining module 802 may perform the processing functions of the network node. For example, determining module 802 may determine which index(es) for obtaining a beta-offset value to communicate in control information to wireless devices 110. The determining module 802 may include analog and/or digital circuitry configured to perform any of the functions of the determining module 802 and/or processing circuitry 124 described above. The functions of the determining module 802 described above may, in certain embodiments, be performed in one or more distinct modules.

The communication module 804 may perform the transmission functions of the network node. For example, in certain embodiments the communication module 804 may communicate control information to wireless device 110. The control information comprises one or more indexes for obtaining a beta-offset value for UCI transmissions on sPUSCH. The communication module 804 may include a transmitter and/or a wireless interface, such as wireless interface 122 described above in relation to FIG. 5. The communication module 804 may include circuitry configured to wirelessly transmit messages and/or signals. In particular embodiments, the communication module 804 may receive messages and/or signals for transmission from the determining module 802. In certain embodiments, the functions of the communication module 804 described above may be performed in one or more distinct modules.

The receiving module 806 may perform the receiving functions of the network node. For example, the receiving module 806 may receive UCI that wireless device 110 transmits on sPUSCH using the obtained beta-offset value. The receiving module 806 may include a receiver and or a wireless interface, such as wireless interface 122 described above in relation to FIG. 5. The receiving module 806 may include circuitry configured to wirelessly receive messages and or signals. In certain embodiments the receiving module 806 may include circuitry (which may comprise one or more interfaces) configured to reserve information from other circuitry within the network node. As an example, processing circuitry 124 may use internal interface(s) to receive information from memory 126 of radio access node 120. As another example, a higher layer process of the network node may be configured to receive signals from a lower layer process of the network node via one or more internal interfaces. In particular embodiments, the receiving module 806 may communicate received messages and/or signals to the determining module 802. The functions of the receiving module 806 described above may, in certain embodiments, be performed in one or more distinct modules.

In certain embodiments, some or all of the modules shown in FIG. 8 can be combined with one or more modules shown in FIG. 5. As an example, certain embodiments may combine at least some of the functionality of the processing circuitry (FIG. 5) with the determining module (FIG. 8).

Figure 9:
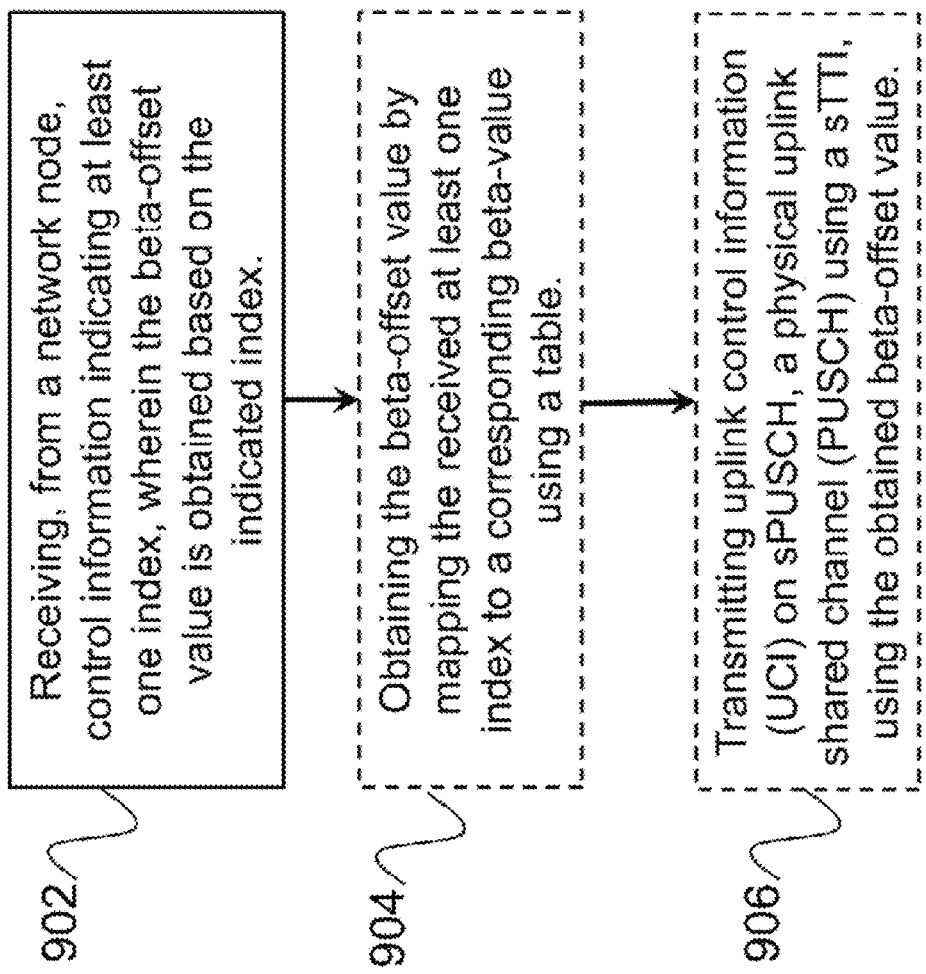
FIG. 9 is a flow diagram illustrating an example of a method for use in a wireless device, in accordance with certain embodiments.

FIG. 9 is a flow diagram illustrating an example of a method for use in a wireless device for obtaining a beta-offset value, wherein the wireless device is transmitting uplink using a shortened transmission time interval (sTTI), in accordance with certain embodiments. At step 902, the method comprises receiving, from a network node, control information indicating at least one index, wherein the beta-offset value is obtained based on the indicated index. At step 904, the method comprises obtaining the beta-offset value by mapping the received at least one index to a corresponding beta-value using a table. Examples of such tables are described throughout this disclosure, including with respect to solutions 1-5 and FIG. 6 above. Step 904 may be optional in some embodiments. At step 906, the method comprises transmitting uplink control information (UCI) on sPUSCH, a physical uplink shared channel (PUSCH) using a sTTI, using the obtained beta-offset value. Step 906 may be optional in some embodiments.

Figure 10:
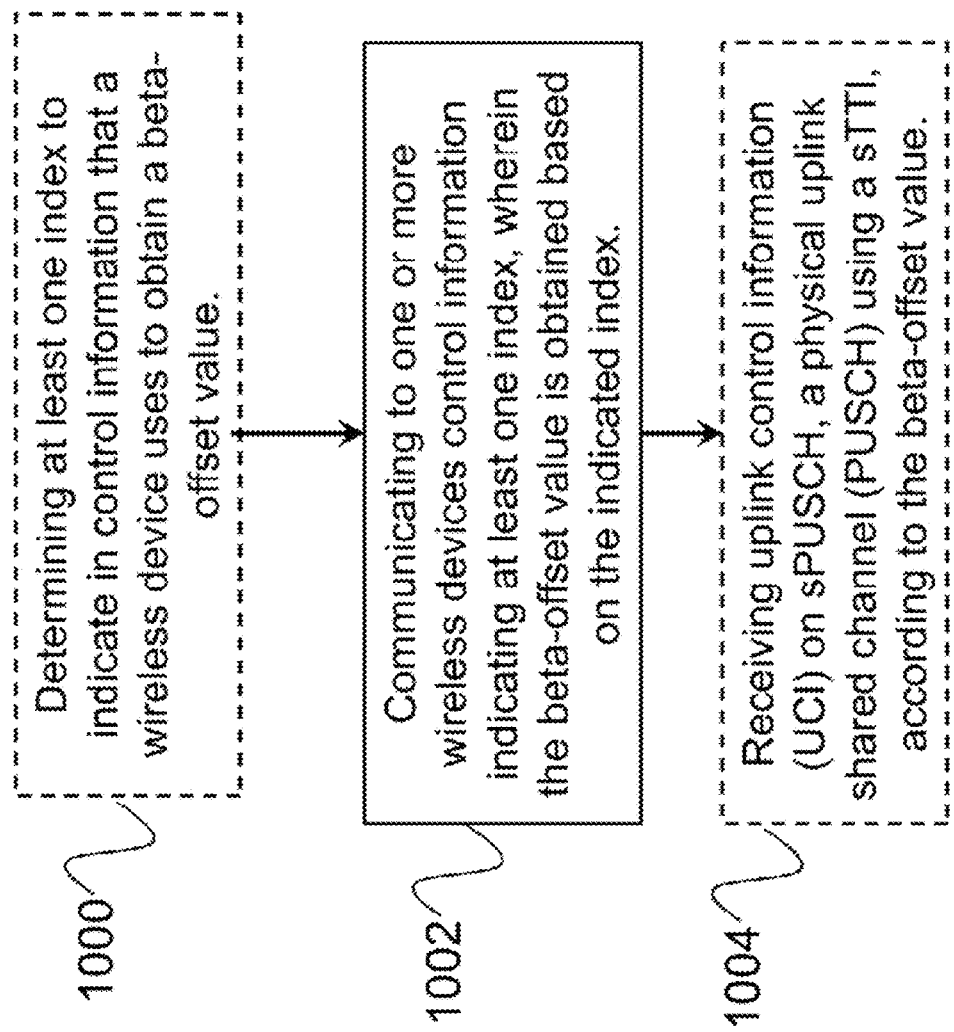
FIG. 10 is a flow diagram illustrating an example of a method for use in a network node, in accordance with certain embodiments.
Figure 11:
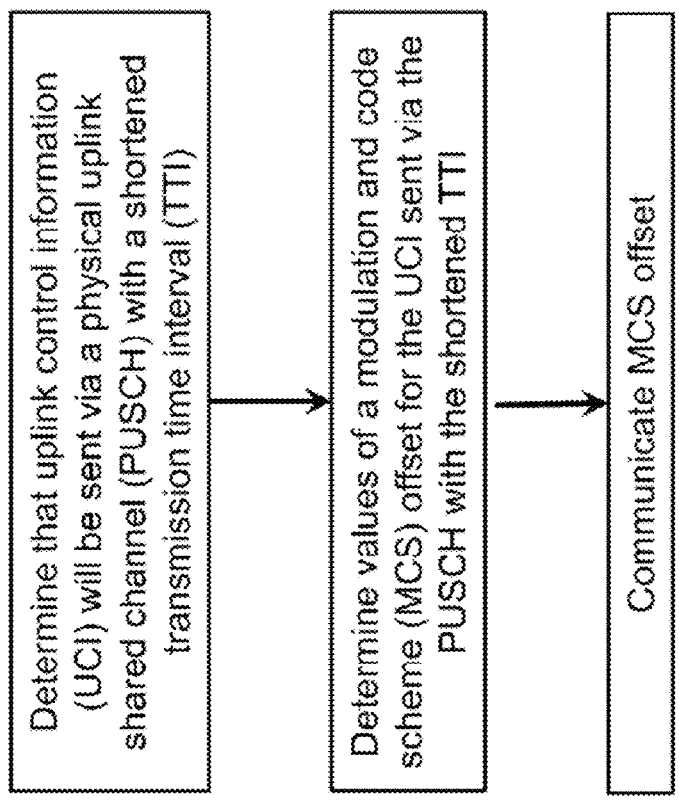
FIG. 11 is a flow diagram illustrating an example of a method for determining a beta-offset, in accordance with certain embodiments.

FIG. 10 is a flow diagram illustrating an example of a method for use in a network node for indicating a beta-offset value to a wireless device, wherein the wireless device is transmitting uplink transmissions using a shortened transmission time interval (sTTI), in accordance with certain embodiments. At step 1000, the method comprises determining at least one index to indicate in control information that a wireless device uses to obtain a beta-offset value. In some embodiments, the at least one index is selected from a plurality of indexes each mapping to a corresponding beta-offset value using a table. Step 1000 may be optional in some embodiments. At step 1002, the method comprises communicating to one or more wireless devices control information indicating at least one index, wherein the beta-offset value is obtained based on the indicated index. For example, in some embodiments, a wireless device receiving the control information may obtain the beta-offset value by mapping the received at least one index to a corresponding beta-value using a table. Examples of such tables are described throughout this disclosure, including with respect to solutions 1-5 and FIG. 6 above. At step 1004, the method comprises receiving uplink control information (UCI) on sPUSCH, a physical uplink shared channel (PUSCH) using a sTTI, according to the beta-offset value. Step 1004 may be optional in some embodiments. FIG. 11 illustrates an example of a method that may be used in a radio node, such as a wireless device 110 or a radio access node 120. The radio access node may determine that uplink control information (UCI) will be sent via a physical uplink shared channel (PUSCH) with a shortened transmission time interval (TTI), determine values of a modulation code scheme (MCS) offset for the UCI sent via the PUSCH with the shortened TTI, and communicate the MCS offset. As an example, if the radio node is a radio access node 120, such as an eNB, the radio node may communicate the MCS offset to the wireless device 110 that is sending uplink control information to instruct the wireless device 110 which MCS offset to use for the uplink control information. As another example, if the radio node is a wireless device, such as a UE, the radio node may communicate the MCS offset to an eNB that will receive the uplink control information to inform the eNB of the MCS offset that will be used or to request permission to use the MCS offset.

Figure 12:
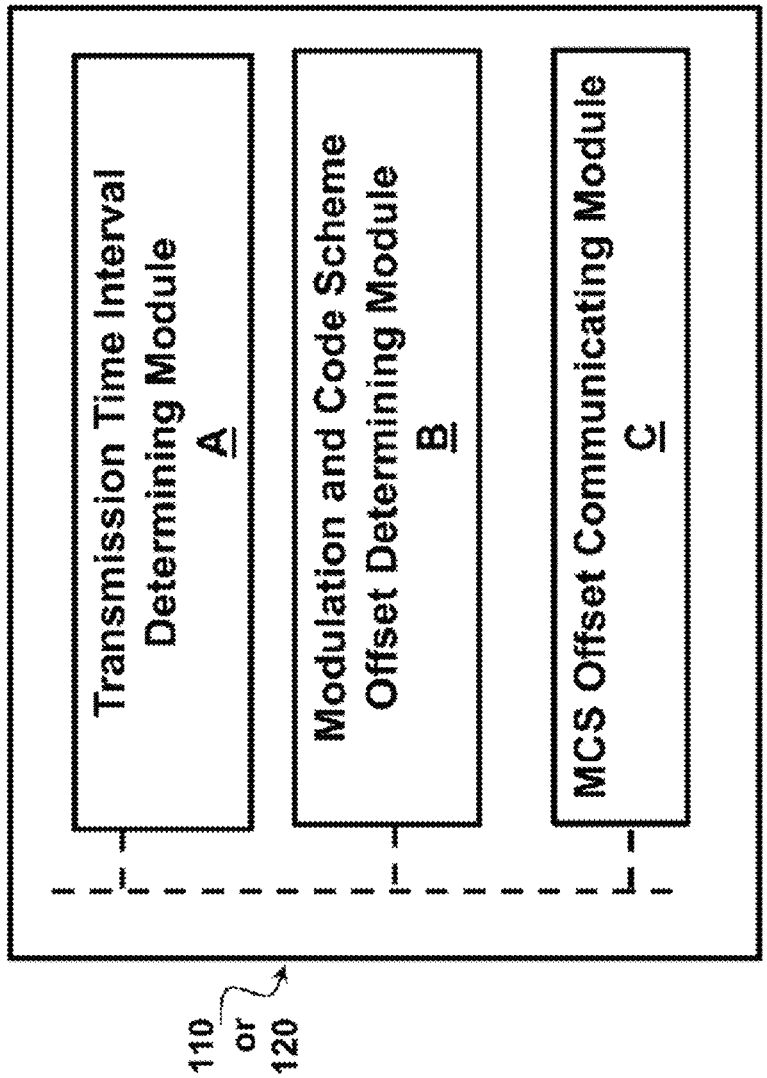
FIG. 12 is a block diagram illustrating an example of components in node, in accordance with certain embodiments.

FIG. 12 below illustrates an example of modules that may be included in the radio node. In certain embodiments, the radio node may include a transmission time interval determining module (A) that determines a length of a transmission time interval for a transmission of uplink control information and/or whether the uplink control information, will use a shortened transmission time interval, a modulation and code scheme offset determining module (B) that determines an MCS offset for the uplink control information based on the transmission time interval determined by module (A) (e.g., based on whether a shortened TTI will be used), and an MCS offset communicating module (C) to communicate the MCS offset determined by module (B). In certain embodiments, the modules may be implemented using processing circuitry (such as described with respect to FIGS. 4-5. The radio node may include some or all of the described modules, or other suitable modules could be used to perform the described functionality. The modules may be integrated in one component or separated among multiple components.

Example details of the embodiments are summarized in the enumerated embodiments provided below.

1. A method for use in a radio node, the method comprising:
   determining that uplink control information (UCI) will be sent via a physical uplink shared channel (PUSCH) with a shortened transmission time interval (TTI); and
   determining values of beta offset, that is, modulation and code scheme (MCS) offset values, for the UCI sent via the PUSCH with the shortened TTI.

2. The example method of embodiment 1, wherein the MCS offset is determined based on reusing one or more pre-defined tables for transmitting the UCI on a PUSCH with a non-shortened TTI.

3. The example method of any of embodiments 1-2, wherein an index used for configuring the MCS offset is determined based on a payload size of a hybrid automatic repeat request-acknowledgement (HARQ-ACK) transmission.

4. The example method of any of embodiments 1-3, wherein an index used for configuring the MCS offset is determined independently of the length of the shortened TTI.

5. The example method of any of embodiments 1-3, wherein an index used for configuring the MCS offset is determined based on the length of the shortened TTI.

6. The example method of embodiment 1, wherein the MCS offset is determined based on applying a scaling factor to one or more pre-defined tables for transmitting the UCI on a PUSCH with a non-shortened TTI.

7. The example method of embodiment 6, wherein an index used for configuring the MCS offset of the UCI on the PUSCH with the shortened TTI is the same as an index used for configuring an MCS offset of UCI on the PUSCH with the n on-shortened TTI.

8. The example method of embodiment 6, wherein an index used for configuring the MCS offset of the UCI on the PUSCH with the shortened TTI is different than an index used for configuring an MCS offset of UCI on the PUSCH with the non-shortened TTI.

9. The example method of embodiment 1, wherein tables are defined for transmitting the UCI on the PUSCH with the shortened TTI and each type of UCI is associated with an MCS offset table.

10. The example method of embodiment 9, wherein the tables differ from pre-defined tables for transmitting UCI on a PUSCH with a non-shortened TTI.

11. The example method of embodiment 9 or 10, wherein, the MCS offset table associated with the each type of UCI depends on the length of the shortened TTI.

12. The example method of embodiment 9 or 10, wherein the MCS offset table associated with the each type of UCI is independent of the length of the shortened TTI.

13. The example method of embodiment 1, wherein the shortened transmission time interval is less than a transmission time interval specified in long term evolution (LTE) release 8.

14. The example method of any of embodiments 1-13, wherein the radio node comprises a wireless device.

15. The example method of any of embodiments 1-13, wherein the radio node comprises a radio access node.

16. The example method of embodiment 15, wherein the radio access node configures the UCI transmission on the PUSCH with the shortened TTI by taking into account reliability of the UCI transmission and system throughput.

17. A radio node, the method comprising:
   determine that uplink control information (UCI) will be sent via a physical uplink shared channel (PUSCH) with a shortened transmission time interval (TTI); and
   determine values of beta offset, i.e., modulation and code scheme (MCS) offset values, for the UCI sent via the PUSCH with the shortened TTI.

18. The example radio node of embodiment 17, wherein the one or more processors are further con figured to perform any one or more of the steps of example embodiments 1-16.

A summary of certain embodiments disclosed here in is provided below.

A. Certain embodiments relate to methods for use in a wireless device, for example;

According to some embodiments, a method is disclosed for use in a wireless device for obtaining a beta-offset value, wherein the wireless device is transmitting uplink using a shortened transmission time interval (sTTI). The method comprises receiving (602, 902), from a network node, control information indicating at least one index, wherein the beta-offset value is obtained based on the indicated index.

In certain embodiments, the method further comprises obtaining (604, 904) the beta-offset value by mapping the received at least one index to a corresponding beta-value using a table.

In certain embodiments, the method further comprises transmitting (606, 906) uplink control information (UCI) on sPUSCH, a physical uplink shared channel (PUSCH) using a sTTI, using the obtained beta-offset value.

In certain embodiments, the at least one index is selected from a plurality of indexes each mapping to a corresponding beta-offset value using a table.

In certain embodiments, the beta-offset value is a modulation and coding scheme (MCS) offset for uplink control information (UCI) being sent on sPUSCH, a physical uplink shared channel (PUSCH) using a sTTI.

In certain embodiments, the table comprises at least one index corresponding to a beta-offset value for transmitting UCI on the sPUSCH with the sTTI. Such index is different than any index corresponding to a beta-offset value for transmitting UCI on the PUSCH with the normal TTI of 1 ms.

In certain embodiments, the at least one index is specific for communication using sTTI, while the table used is common for sTTI and normal TTI of 1 millisecond (ms).

In certain embodiments, the table is configured to be the same as an existing table for transmitting the uplink control information (UCI) on a physical uplink shared channel (PUSCH) with a normal TTI of 1 millisecond (ms).

In certain, embodiments, the existing table is configured according to LTE Release 14 or earlier release.

In certain embodiments, the table is selected from a plurality of tables and the control information indicates the selected table.

In certain embodiments, the plurality of tables comprise a first table associated with a first type of UCI and a second table associated with a second type of UCI.

In certain embodiments, the beta-offset value in the first table is independent of the length of the sTTI for the first type of UCI.

In certain embodiments, the beta-offset value in the first table depends on the length of the sTTI for the first type of UCI.

In certain embodiments, the index(es) indicated in the control information are based on a payload size of a hybrid automatic repeat request-acknowledgement (HARQ-ACK) transmission.

In certain embodiments, the index is received via radio resource control (RRC) signaling.

In certain embodiments, the table comprises one or more indexes defined for normal TTI of 1 millisecond (ms) according to an existing table. The table also comprises and one or more indexes defined for sTTI that have been added to the existing table. The indicated index corresponds to one of the indexes defined for sTTI.

In certain embodiments, the control information indicates whether to apply scaling to the beta-offset value that maps to the indicated index.

In certain embodiments, the scaling is according to a scaling factor that is pre-defined based on the length of the sTTI.

In certain embodiments, the control information further comprises a scaling factor to apply to the beta-offset value that maps to the indicated index.

In certain embodiments, the control information indicates more than one index. The method further comprises selecting, by the wireless device, which beta-offset value to apply. The selected beta-offset value corresponding to any of the indicated indexes.

In certain embodiments, the table reuses fewer than all of the existing indexes of an existing table.

In certain embodiments, the sTTI is less than a transmission time interval specified in long term evolution (LTE) release 8.

According to certain embodiments, a method is disclosed for use in a wireless device transmitting UCI on sPUSCH, for obtaining a beta-offset value. The method comprises receiving from a network node an index, wherein the index is configured independently for sTTI transmission compared to normal TTI transmission. The method further comprises mapping the received index to a table and thereby obtaining the beta-offset value.

B Certain embodiments relate to methods for use in a network node, for example;

According to some embodiments, a method is disclosed for use in a network node for indicating a beta-offset value to a wireless device, wherein the wireless device is transmitting uplink transmissions using a shortened transmission time interval (sTTI). The method comprises communicating (602, 1001) to one or more wireless devices control information indicating at least one index, wherein the beta-offset value obtained based on the indicated index.

In certain embodiments, the method further comprises receiving (606, 1004) uplink control information (UCI) on sPUSCH, a physical uplink shared channel (PUSCH) using a sTTI, according to the beta-offset value.

In certain embodiments, the beta-offset value is obtained by mapping the at least one index to a corresponding beta-offset value using a table.

In certain embodiments, the at least one index is selected from a plurality of indexes each, mapping to a corresponding, beta-offset value using a table.

In certain embodiments, the beta-offset value is a modulation and coding scheme (MCS) offset for uplink control information (UCI) being sent on sPUSCH, a physical uplink shared channel (PUSCH) using a sTTI.

In certain embodiments, the table comprises at least one index corresponding to a beta-offset value for transmitting UCI on the sPUSCH with the sTTI. Such index is different than any index corresponding to a beta-offset value for transmitting UCI on the PUSCH with the normal TTI of 1 ms.

In certain embodiments, the at least one index is specific for communication using sTTI, while the table used is common for sTTI and normal TTI of 1 millisecond (ms).

In certain embodiments, the table is configured to be the same as an existing table for transmitting the uplink control information (UCI) on a physical uplink shared channel (PUSCH) with a normal TTI of 1 millisecond (ms).

In certain embodiments, the existing table is configured according to LTE Release 14 or earlier release.

In certain embodiments, the table is selected from a plurality of tables and the control information indicates the selected table.

In certain embodiments, the plurality of tables comprise a first table associated with a first type of UCI and a second table associated with a second type of UCI.

In certain embodiments, the beta-offset value in the first table is independent of the length of the sTTI for the first type of UCI.

In certain embodiments, the beta-offset value in the first table depends on the length of the sTTI for the first type of UCI.

In certain embodiments, prior to communicating the control information, the method comprises determining (1000) which index(es) to indicate in the control information. Certain embodiments determine the index(es) based on a pay load size of a hybrid automatic repeat request-acknowledgement (HARQ-ACK) transmission.

In certain embodiments, the method comprises determining which index(es) to indicate in the control information independently of the length of the sTTI.

In certain, embodiments, the index is communicated via radio resource control (RRC) signaling.

In certain embodiments, the table comprises one or more indexes defined for normal TTI of 1 millisecond (ms) according to an existing table. The table further comprises one or more indexes defined for sTTI and added to the existing table. The indicated index corresponds to one of the indexes defined for sTTI.

In certain embodiments, the control information indicates whether to apply scaling to the beta-offset value that maps to the indicated index.

In certain embodiments, the scaling is according to a scaling factor that is pre-defined based on the length of the sTTI.

In certain embodiments, the control information further comprises a scaling factor to apply to the beta-offset value that maps to the indicated index.

In certain embodiments, the control information indicates more than one index. By communicating the control information comprising more than one index, the method indicates that the wireless device is permitted to apply the beta-offset value corresponding to any of the indicated indexes.

In certain embodiments, the table reuses fewer than all of the existing indexes of an existing table.

In certain embodiments, the method comprises determining which index(es) to indicate in the control information, based on the length of the sTTI.

In certain embodiments, the sTTI is less than a transmission time interval specified in long term evolution (LTE) release 8.

C. Certain embodiments relate to a wireless device, for example:

According to certain embodiments, a wireless device (110) comprises memory (116) operable to more instructions and processing circuitry (114) operable to execute the instructions, whereby the wireless device is operable to receive, from a network node, control information indicating at least one index. The wireless device is operable to obtain a beta-offset value for an uplink transmission having a shortened transmission time interval (sTTI). The beta-offset value is obtained based on the indicated index.

In certain embodiments, to obtain the beta-offset value, the wireless device is further operable to map the received at least one index to a corresponding beta-value using a table.

In certain embodiments, the wireless device is further operable to transmit uplink control information (UCI) on sPUSCH, a physical uplink shared channel (PUSCH) using an sTTI, using the obtained beta-offset value.

In certain embodiments, the at least one index is selected from a plurality of indexes each mapping to a corresponding beta-offset value using a table.

In certain embodiments, the beta-offset value is a modulation and coding scheme (MCS) offset for uplink control information (UCI) being sent on the sPUSCH.

In certain embodiments, the table comprises at least one index corresponding to a beta-offset value for transmitting UCI on the sPUSCH with the sTTI. Such index is different than any index corresponding to a beta-offset value for transmitting UCI on the PUSCH with the normal TTI of 1 ms.

In certain embodiments, the at least one index is specific for communication using sTTI, while the table used is common for sTTI and normal TTI of 1 millisecond (ms).

In certain embodiments, the table is configured to be the same as an existing table for transmitting the uplink control information (UCI) on a physical uplink shared channel (PUSCH) with a normal TTI of 1 millisecond (ms).

In certain embodiments, the existing table is configured according to LTE Release 14 or earlier release.

In certain embodiments, the table is selected from a plurality of tables and the control information indicates the selected table.

In certain embodiments, the plurality of tables comprise a first table associated with a first type of UCI and a second table associated with a second type of UCI.

In certain embodiments, the beta-offset value in the first table is independent of the length of the sTTI for the first type of UCI.

In certain embodiments, the beta-offset value in the first table depends on the length of the sTTI for the first type of UCI.

In certain embodiments, the index(es) indicated in the control information are based on a payload size of a hybrid automatic repeat request-acknowledgement (HARQ-ACK) transmission.

In certain embodiments, the index is received via radio resource control (RRC) signaling.

In certain embodiments, the table comprises one or more indexes defined for normal TTI of 1 millisecond (ms) according to an existing table. The table further comprises one or more indexes defined for sTTI and added to the existing table. The indicated index corresponds to one of the indexes defined for sTTI.

In certain embodiments, the control information indicates whether to apply scaling to the beta-offset value that maps to the indicated index.

In certain embodiments, the scaling is according to a scaling factor that is pre-defined, based on the length of the sTTI.

In certain embodiments, the control information further comprises a scaling factor to apply to the beta-offset value that maps to the indicated index.

In certain embodiments, the control information indicates more than one index. The wireless device is further operable to select which beta-offset value to apply. The selected beta-offset value corresponds to any of the indicated indexes.

In certain embodiments, the table reuses fewer than all of the existing indexes of an existing table.

In certain embodiments, the sTTI is less than a transmission time interval specified in long term evolution (LTE) release 8.

D. Certain embodiments relate to a network node, for example:

According to certain embodiments, a network node (120) comprises memory (126) operable to store instructions and processing circuitry (124) operable to execute the instructions, whereby the network node is operable to communicate control information to one or more wireless devices. The control information indicates at least one index, wherein a beta-offset value for an uplink transmission having a shortened transmission time interval (sTTI) is obtained based on the indicated index.

In certain embodiments, the network node is further operable to receive uplink control information (UCI) on sPUSCH a physical uplink shared channel (PUSCH) using a sTTI, according to the beta-offset value.

In certain embodiments, the beta-offset value is obtained by mapping the at least one index to a corresponding beta-offset value using a table.

In certain embodiments, the at least, one index is selected front a plurality of indexes each mapping to a corresponding beta-offset value using a table.

In certain embodiments, the beta-offset value is a modulation and coding scheme (MCS) offset for uplink control information (UCI) being sent on sPUSCH, a physical uplink shared channel (PUSCH) using a sTTI.

In certain embodiments, the table comprises at least one index corresponding to a beta-offset value for transmitting UCI on the sPUSCH with the sTTI. Such index is different than any index corresponding to a beta-offset value for transmitting UCI on the PUSCH with the normal TTI of 1 ms.

In certain embodiments, the at least one index is specific for communication using sTTI, while the table used is common for sTTI and normal TTI of 1 millisecond (ms).

In certain embodiments, the table is configured to be the same as an existing table for transmitting the uplink control information (UCI) on a physical uplink shared channel (PUSCH) with, a normal TTI of 1 millisecond (ms).

In certain, embodiments, the existing table is configured according to LTE Release 14 or earlier release.

In certain embodiments, the table is selected from a plurality of tables and the control information indicates the selected table.

In certain embodiments, the plurality of tables comprise a first table associated with a first type of UCI and a second table associated with a second type of UCI.

In certain embodiments, the beta-offset value in the first table is independent of the length of the sTTI for the first type of UCI.

In certain embodiments, the beta-offset value in the first table depends on the length of the sTTI for the first type of UCI.

In certain embodiments, prior to communicating the control information, the network node is further operable to determine which index(es) to indicate in the control information. In certain embodiments, the index(es) are determined based on a payload size of a hybrid automatic repeat request-acknowledgement (HARQ-ACK) transmission.

In certain embodiments, the network node is further operable to determine which index(es) to indicate in the control information independently of the length of the sTTI.

In certain embodiments, the index is communicated via radio resource control (RRC) signaling.

In certain embodiments, the table comprises one or more indexes defined for normal TTI of 1 millisecond (ms) according to an existing table. The table further comprises one or more indexes defined for sTTI and added to the existing table. The indicated index corresponds to one of the indexes defined for sTTI.

In certain embodiments, the control information indicates whether to apply scaling to the beta-offset value that maps to the indicated index.

In certain embodiments, the scaling is according to a scaling factor that is pre-defined based on the length of the sTTI.

In certain embodiments, the control information further comprises a scaling factor to apply to the beta-offset value that maps to the indicated index.

In certain embodiments, the control information indicates more than one index. By communicating the control information comprising more than one index, the network node indicates that the wireless device is permitted to apply the beta-offset value corresponding to any of the indicated indexes.

In certain embodiments, the table reuses fewer than all of the existing indexes of an existing table.

In certain embodiments, the network node is further operable to determine which index(es) to indicate in the control information based on the length of the sTTI.

In certain embodiments, the sTTI is less than a transmission time interval specified in long term evolution (LTE) release 8.

E. Certain embodiments relate to a wireless device, for example:

According to certain embodiments, a computer program product comprises a non-transitory computer readable medium storing computer readable program code. The computer readable program code comprises program code for receiving, from a network node, control information indicating at least one index. The computer readable program code further comprises program code for obtaining a beta-offset value for an uplink transmission having a shortened transmission time interval (sTTI), wherein the beta-offset value is obtained based on the indicated index.

According to certain embodiments, a computer program product comprises a non-transitory computer readable medium, storing computer readable program code. The computer readable program code comprises program code for communicating control information to one or more wireless devices. The control information indicates at least one index, wherein a beta-offset value for an uplink transmission having a shortened transmission time interval (sTTI) is obtained based on the indicated index.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document "each" refers to each member of a set or each member of a subset of a set.

Modifications, additions, or omissions may be made to the methods described herein, without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, the above description of the embodiments does not constrain this disclosure. Other changes, substitutions, and alterations are possible without departing from the spirit and scope of this disclosure.

The invention claimed is:

1. A method for use in a wireless device for obtaining a beta-offset value, wherein the wireless device is transmitting uplink using a shortened transmission time interval (sTTI), the method comprising:
   receiving, from a network node, control information indicating at least one index, wherein the beta-offset value is obtained based on the indicated index;
   wherein the beta-offset value is a modulation and coding scheme (MCS) offset for uplink control information (UCI) being sent on sPUSCH, a physical uplink shared channel (PUSCH) using a sTTI.

2. The method of claim 1, further comprising:
   obtaining the beta-offset value by mapping the received at least one index to a corresponding beta-value using a table.

3. The method of claim 2, wherein the table comprises at least one index corresponding to a beta-offset value for transmitting UCI on the sPUSCH with the sTTI, and wherein the at least one index corresponding to the beta-offset value for transmitting UCI on the sPUSCH with the sTTI is different than any index corresponding to a beta-offset value for transmitting UCI on a PUSCH with a normal transmission time interval (TTI) of 1 ms.

4. The method of claim 2, wherein the at least one index is specific for communication using sTTI, while the table used is common for sTTI and normal TTI of 1 millisecond (ms).

5. The method of claim 2, wherein the table is configured to be the same as an existing table for transmitting the uplink control information (UCI) on a physical uplink shared channel (PUSCH) with a normal TTI of 1 millisecond (ms).

6. The method of claim 5, wherein the existing table is configured according to LTE Release 14 or earlier release.

7. The method of claim 2, wherein the table is selected from a plurality of tables and the control information indicates the selected table.

8. The method of claim 7, wherein the plurality of tables comprise a first table associated with a first type of UCI and a second table associated with a second type of UCI.

9. The method of claim 8, wherein the beta-offset value in the first table is independent of the length of the sTTI for the first type of UCI.

10. The method of claim 8, wherein the beta-offset value in the first table depends on the length of the sTTI for the first type of UCI.

11. The method of claim 2, wherein the table comprises:
one or more indexes defined for normal TTI of 1 millisecond (ms) according to an existing table; and
one or more indexes defined for sTTI and added to the existing table;
wherein the indicated index corresponds to one of the indexes defined for sTTI.

12. The method of claim 2, wherein the table reuses fewer than all of the existing indexes of an existing table.

13. The method claim 1, further comprising:
transmitting uplink control information (UCI) on sPUSCH, a physical uplink shared channel (PUSCH) using a sTTI, using the obtained beta-offset value.

14. The method of claim 1, wherein the at least one index is selected from a plurality of indexes each mapping to a corresponding beta-offset value using a table.

15. The method of claim 1, wherein the index(es) indicated in the control information are based on a payload size of a hybrid automatic repeat request-acknowledgement (HARQ-ACK) transmission.

16. The method of claim 1, wherein the index is received via radio resource control (RRC) signaling.

17. The method of claim 1, wherein the control information indicates whether to apply scaling to the beta-offset value that maps to the indicated index.

18. The method of claim 17, wherein the scaling is according to a scaling factor that is pre-defined based on the length of the sTTI.

19. The method of claim 17, wherein the control information further comprises a scaling factor to apply to the beta-offset value that maps to the indicated index.

20. The method of claim 1, wherein:
the control information indicates more than one index; and
the method further comprises selecting, by the wireless device, which beta-offset value to apply, the selected beta-offset value corresponding to any of the indicated indexes.

21. The method of claim 1, wherein the sTTI is less than a transmission time interval specified in long term evolution (LTE) release 8.

22. A method for use in a network node for indicating a beta-offset value to a wireless device, wherein the wireless device is transmitting uplink transmissions using a shortened transmission time interval (sTTI), the method comprising:
communicating to one or more wireless devices control information indicating at least one index, wherein:
the beta-offset value is obtained based on the indicated index; and
the beta-offset value is a modulation and coding scheme (MCS) offset for uplink control information (UCI) being sent on sPUSCH, a physical uplink shared channel (PUSCH) using a sTTI.

23. The method of claim 22, further comprising determining which index(es) to indicate in the control information independently of the length of the sTTI.

24. The method of claim 22, further comprising determining which index(es) to indicate in the control information based on the length of the sTTI.

25. A wireless device comprising memory operable to store instructions and processing circuitry operable to execute the instructions, whereby the wireless device is operable to:
receive, from a network node, control information indicating at least one index; and
obtain a beta-offset value for an uplink transmission having a shortened transmission time interval (sTTI), wherein:
the beta-offset value is obtained based on the indicated index; and
the beta-offset value is a modulation and coding scheme (MCS) offset for uplink control information (UCI) being sent on sPUSCH, a physical uplink shared channel (PUSCH) using a sTTI.

26. A network node comprising memory operable to store instructions and processing circuitry operable to execute the instructions, whereby the network node is operable to:
communicate control information to one or more wireless devices, the control information indicating at least one index, wherein:
a beta-offset value for an uplink transmission having a shortened transmission time interval (sTTI) is obtained based on the indicated index; and
the beta-offset value is a modulation and coding scheme (MCS) offset for uplink control information (UCI) being sent on sPUSCH, a physical uplink shared channel (PUSCH) using a sTTI.

27. A computer program product comprising a non-transitory computer readable medium storing computer readable program code, the computer readable program code comprises:
program code for receiving, from a network node, control information indicating at least one index; and
program code for obtaining a beta-offset value for an uplink transmission having a shortened transmission time interval (sTTI), wherein:
the beta-offset value is obtained based on the indicated index; and
the beta-offset value is a modulation and coding scheme (MCS) offset for uplink control information (UCI) being sent on sPUSCH, a physical uplink shared channel (PUSCH) using a sTTI.

28. A method for use in a wireless device transmitting UCI on sPUSCH, for obtaining a beta-offset value, the method comprising:
receiving from a network node an index, wherein the index is configured independently for sTTI transmission compared to normal TTI transmission; and
mapping the received index to a table and thereby obtaining the beta-offset value, wherein the beta-offset value is a modulation and coding scheme (MCS) offset for the UCI being sent on the sPUSCH.

* * * * *